(12) United States Patent
Iwai et al.

(10) Patent No.: US 7,175,197 B2
(45) Date of Patent: Feb. 13, 2007

(54) GAS GENERATOR FOR AIR BAG AND AIR BAG DEVICE

(75) Inventors: Yasunori Iwai, Osaka (JP); Katsuhito Miyaji, Hyogo (JP); Nobuyuki Ohji, Hyogo (JP); Mikio Yabuta, Hyogo (JP); Atsushi Hatomoto, Hyogo (JP); Toshiro Iwakiri, Hyogo (JP); Nobuyuki Katsuda, Hyogo (JP); Yoshihiro Nakashima, Hyogo (JP); Takashi Okuyama, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 96 days.

(21) Appl. No.: 10/343,717

(22) PCT Filed: Oct. 31, 2001

(86) PCT No.: PCT/JP01/09562

§ 371 (c)(1),
(2), (4) Date: Feb. 3, 2003

(87) PCT Pub. No.: WO02/36395

PCT Pub. Date: May 10, 2002

(65) Prior Publication Data

US 2003/0132623 A1   Jul. 17, 2003

(30) Foreign Application Priority Data

| Oct. 31, 2000 | (JP) | ............................. 2000-333503 |
| Oct. 31, 2000 | (JP) | ............................. 2000-333504 |
| Oct. 31, 2000 | (JP) | ............................. 2000-333505 |
| Jul. 11, 2001 | (JP) | ............................. 2001-210126 |
| Oct. 29, 2001 | (JP) | ............................. 2001-331399 |
| Oct. 29, 2001 | (JP) | ............................. 2001-331400 |
| Oct. 29, 2001 | (JP) | ............................. 2001-331401 |

(51) Int. Cl.
*B60R 21/26* (2006.01)

(52) U.S. Cl. ...................... 280/736; 280/741; 280/742

(58) Field of Classification Search ................ 280/742, 280/736, 741, 740
See application file for complete search history.

(56) References Cited

U.S. PATENT DOCUMENTS 5,149,129 A   9/1992   Unterforsthuber et al.
5,419,578 A   5/1995   Storey et al.

(Continued)

FOREIGN PATENT DOCUMENTS

EP   0926015 A2   6/1999

(Continued)

*Primary Examiner*—Paul N. Dickson
*Assistant Examiner*—Joselynn Y. Sliteris
(74) *Attorney, Agent, or Firm*—Birch, Stewart, Kolasch & Birch, LLP

(57) ABSTRACT

A gas generator has an inner cylindrical member disposed in a cylindrical housing, an annular first combustion chamber provided radially in the outside of the inner cylindrical member, and, in the combustion chamber, a ratio of its radial average distance to its axial average length is adjusted to be in the range of 0.2 to 2.0. The gas generator has a retainer which changes a flow of a gas ejected from a through-hole in the inner cylindrical member and has a cylindrical portion for collecting fluid and semifluid combustion products included in the gas.

27 Claims, 20 Drawing Sheets

U.S. PATENT DOCUMENTS

| | | |
|---|---|---|
| 5,613,706 A | 3/1997 | Parker et al. |
| 6,412,815 B1 | 7/2002 | Nakashima et al. |
| 6,491,321 B1 * | 12/2002 | Nakashima et al. ........ 280/736 |
| 6,722,694 B1 * | 4/2004 | Nakashima et al. ........ 280/736 |
| 6,857,658 B2 * | 2/2005 | Iwai et al. .................. 280/741 |
| 7,052,040 B2 * | 5/2006 | Matsuda et al. ............ 280/741 |

FOREIGN PATENT DOCUMENTS

| | | |
|---|---|---|
| EP | 1024062 A1 | 8/2000 |
| JP | 6-99786 A | 4/1994 |
| JP | 3009568 U | 4/1995 |
| JP | 3019432 U | 12/1995 |
| JP | 8-164816 A | 6/1996 |
| JP | 3029968 U | 10/1996 |
| JP | 3038714 U | 6/1997 |
| JP | 9-207705 A | 8/1997 |
| JP | 11-59318 A | 3/1999 |
| JP | 11-348711 A | 12/1999 |
| WO | WO 00/18618 A1 | 4/2000 |

* cited by examiner

GAS GENERATOR FOR AIR BAG AND AIR BAG DEVICE

This application is a national phase under 35 U.S.C. § 371 of PCT International Application No. PCT/JP01/09562 which has an international filing date of Oct. 31, 2001, which designated the United States of America.

BACKGROUND OF THE INVENTION

1. Field of the Invention

The present invention relates to a gas generator for an air bag disposed in a vehicle and preferably used to protect a passenger from an impact, and to an air bag apparatus using the gas generator.

2. Description of the Related Art

An air bag apparatus is mounted in an automobile and the like to protect a passenger from an impact at the time of a collision. The air bag apparatus is formed to rapidly generate a gas by an actuation of a gas generator for an airbag, thereby expanding the air bag (bag body).

Generally in the gas generator, when ignition means is actuated by the impact, a gas generating agent is ignited and burnt to generate a high temperature and high pressure gas, and the generated gas is ejected from a gas discharging port into the air bag (bag body).

Conventionally, the ignition means only comprises an igniter actuated by an actuating signal, or comprises a combination of the igniter and a transfer charge adapted to be ignited and burnt by the actuated igniter.

A combustion chamber in which the gas generating agent is accommodated is variously designed depending upon a shape of a housing, a layout of necessary constituent members and the like, and as to the gas generating agents charged therein, there are various shapes and compositions.

A combustion state of the gas generating agent is an important design factor for adjusting an operation performance of the gas generator. Therefore, it is preferable that the gas generating agent is effectively and reliably ignited and burnt by the actuation of the ignition means.

However, the conventional gas generator is still susceptible to improvements for enhancing the ignition performance of the gas generating agent.

The amount of the gas generating agent used in the gas generator is also an important factor for adjusting the operation performance of the gas generator. Usually, the gas generating agent is charged in the combustion chamber, so that it is necessary to adjust the capacity of the combustion chamber in order to adjust the amount of the gas generating agent.

Further, in a conventional gas generator having two combustion chambers in the housing, the gas generating agent is charged in each of the combustion chambers. In order to obtain an optimal operation performance, the gas generator is formed such that igniting timing of the gas generating agent in each of the combustion chambers can be adjusted. In such a gas generator, it is preferable that the combustion of the gas generating agents accommodated in each combustion chamber can independently be adjusted, and it is necessary that the gas generator can easily be produced and a size thereof is reduced.

SUMMARY OF THE INVENTION

The present invention provides a gas generator in which ignition and combustion performance of the gas generating agent is enhanced by improving an inside structure of the gas generator, thereby enhancing the operation performance.

In a gas generator for an airbag of the present invention, by adjusting a shape of the combustion chamber in which the gas generating agent is accommodated and an ejecting position of a flame caused by an actuation of the ignition means toward the combustion chamber, the ignition and combustion performance of the gas generating agent is enhanced and a sufficient actuation output is obtained.

In other words, the present invention provides a gas generator for an air bag comprising, in cylindrical housing having a gas discharging port, an inner cylindrical member defining an inner space of the housing, ignition means arranged inside the inner cylindrical member, a first combustion chamber for accommodating a gas generating agent and provided outside the inner cylindrical member, wherein a ratio (D/L) of an average distance (D) in a radial direction of the first combustion chamber to the average length (L) in an axial direction of the gas generator is in the range of 0.2 to 2.0.

Here, the first combustion chamber is a space for accommodating the gas generating agent in the housing. The average length (L) of the first combustion chamber is an average length of the first combustion chamber in the axial direction of the housing. The average distance (D) of the first combustion chamber is an average distance of the first combustion chamber in the radial direction of the housing.

The inner cylindrical member is provided with a flame-transferring port for ejecting flames generated by an actuation of the ignition means into the first combustion chamber. Also by controlling a position where the flame-transferring port is formed in relation to the length of the first combustion chamber, the object of the invention can be achieved. More specifically, the object can also be achieved by a gas generator for an air bag in which the flame-transferring port is formed in the area ($L_1/L \leq 1/4$) such that a distance $L_1$ from the center of the average length (L) of the first combustion chamber is not more than 1/4 of the average length L. When the housing comprises a diffuser shell provided with the gas discharging port and a closure shell, cylindrical in shape and having a bottom, and that defines an inner space together with the diffuser shell, the inner bottom surface of the housing corresponds to the inner bottom surface of the closure shell.

It is preferable that the flame-transferring port is positioned in an area such that a distance $L_1$ from the center of the average length L of the first combustion chamber to the center of the flame-transferring port is not more than 1/4 of the average length L.

According to the gas generator of the present invention, by adjusting the D/L to be in the range of 0.2 to 2.0 and further arranging $L_1/L \leq 1/4$, flames of the ignition means for igniting the gas generating agent in the first gas generating chamber (first gas generating agent, hereinafter) is ejected toward the center of an axial direction in the first combustion chamber, so that the ignition and combustion performance of the first gas generating agent is enhanced. That is, the flame of the ignition means ejected into the first combustion chamber spreads widely in the first combustion chamber to ignite more gas generating agents than other wise, so that the ignition and combustion performance of the first gas generating agent can be enhanced.

The present invention also provides a gas generator in which the inner cylindrical member is disposed in the housing, the ignition means is arranged inside the inner cylindrical member, the first combustion chamber is provided outside the inner cylindrical member and the flame from the ignition means, disposed inside the inner cylindrical member, passes through the flame-transferring port provided in the inner cylindrical member and ejected into the first combustion chamber. Therefore, the present invention can be realized regardless of whether two combustion chambers are defined in the housing, a layout thereof, and the number of ignition means. The present invention can be also realized with a gas generator in which the combustion chamber accommodating the gas generating agent is provided outside the inner cylindrical member in a radial direction of the gas generator, but no other combustion chamber is provided inside the inner cylindrical member. In this case, the ignition means can be accommodated inside the inner cylindrical member.

In the present invention, the length of the first combustion chamber in the axial direction can be limited by an inner surface of the housing existing in the axial direction of the first combustion chamber. The first combustion chamber can also be adjusted by a retainer having a partition wall surface disposed adjacent an end of the first combustion chamber in the axial direction. In other words, retainers can be disposed in both ends of the first combustion chamber to limit the axial length of the combustion chamber, or a retainer can be disposed only in one side of the first combustion chamber to limit the length of the combustion chamber, or the length of the combustion chamber can be limited by an inner surface of the housing without providing any retainer in the first combustion chamber. In this case, the average length (L) of the first combustion chamber can be defined as an average distance between the retainers, an average distance between an inner surface of the housing and the retainer, or an average distance between inner surfaces of the housing. The retainer is required to define at least the axial length of the first combustion chamber and is provided with at least a partition wall surface having a shape suitable for limiting the first combustion chamber. The retainer can also form a flow-path for allowing a gas to pass along a side opposite to the first combustion chamber, and can separate coolant means, if required. For example, the first combustion chamber and the flow-path for the working gas can be partitioned by the partition wall surface.

Further, when the inner cylindrical member is disposed in the housing, an end of the inner cylindrical member is formed into a shape such as an outwardly directed flange-like shape to close the first combustion chamber, such that the axial length of the first combustion chamber can be limited.

The distance of the first combustion chamber in the radial direction can be defined by the outer peripheral surface of the inner cylindrical member and a member arranged outside the first combustion chamber. In this case, the average distance (D) can be defined as an average distance between the outer peripheral surface of the inner cylindrical member and the member arranged outside the first combustion chamber. As the member arranged outside of the first combustion chamber, for example, coolant means or filter means for cooling and/or purifying the gas generated by combustion of the gas generating agent can be used.

In the gas generator, the ignition performance of the first gas generating agent can be enhanced by the above-described structure of the gas generator. Thus, even if the ignition performance of the first gas generating agent is slightly inferior, the first gas generating agent can be satisfyingly burnt. In other words, by controlling the shape of the first combustion chamber or an arrangement of the flame-transferring port, even the gas generating agent without a satisfying ignition performance can be used as the first gas generating agent. Improvement in the ignition performance of the gas generating agent can be measured, for example, by the time when the maximum pressure inside the gas generator at activation can obtained, or a tank curve (pressure time curve in 60-liter tank) obtained by the 60-liter tank test (tank combustion test).

The gas generator can constitute an air bag apparatus together with an impact sensor for detecting an impact and actuating the gas generator, an air bag into which a gas generated in the gas generator is introduced to inflate, and a module case for accommodating the air bag.

The gas generator is accommodated in the module case together with the air bag (bag body) and provided as a pad module.

In the air bag apparatus, the gas generator is actuated upon the impact sensor detecting the impact and the gas is discharged from the gas discharging port of the housing. The gas flows into the air bag and thereby, the air bag ruptures the module cover and inflates to form a cushion between a passenger and a hard structure in a vehicle to absorb the impact.

In the gas generator for the air bag of the present invention, by adjusting a shape of the first combustion chamber provided outside the inner cylindrical member or adjusting an ejecting position of flames from the ignition means to ignite the first gas generating agent, the ignition of the first gas generating agent in the initial stage of actuation of the gas generator is enhanced. That is, flames of the ignition means ejecting into the first combustion chamber is made to spread widely inside the combustion chamber to ignite more gas generating agents than otherwise.

Therefore, according to the gas generator for the air bag of the invention, by improving an internal structure thereof, the ignition and combustion performance of the gas generating agent is enhanced, and further, the operation performance of the gas generator is enhanced.

Next, the present invention provides a gas generator for an air bag capable of downsizing the gas generator and capable of easily and reliably adjusting a capacity of the combustion chamber accommodating the gas generating agent, and provides a retainer for the gas generator as well as an air bag apparatus using the gas generator.

The retainer according to the present invention is used in a gas generator for an air bag including a cylindrical housing having a gas discharging port, an inner cylindrical member having a cylindrical peripheral wall provided with a through-hole is disposed and at least either of an ignition means and gas generator is disposed in the inner cylindrical member, the retainer comprising a cylindrical portion adapted to be positioned with a distance from an outer peripheral surface of the cylindrical peripheral wall and to face the outer peripheral surface, a flange-shaped partition wall integrally formed with the cylindrical portion, and at least either of the cylindrical portion and the partition wall being adapted to change a gas-flow ejected from the through-hole formed in the cylindrical peripheral wall and adapted to collect combustion products other than gaseous material included in the gas. The combustion products included in the gas are any combustion products, other than gaseous material, such as fluid, semifluid and solid included in the gas ejected from the through-hole.

A flowing direction of the gas ejected from the through-hole provided in the cylindrical peripheral wall is changed by the cylindrical portion of the retainer. At that time, the combustion products collide against the cylindrical portion and/or the partition wall. Thereby, the combustion products adhere to the cylindrical portion and/or the partition wall or drop to be removed from the gas. The combustion products are collected by the cylindrical portion and/or the partition wall of the retainer and thus, it is unnecessary to dispose the coolant means or filter means for removing or reducing the combustion products in the gas ejected from the through-hole and as a result, the producing cost and capacity of the gas generator can be reduced.

As described above, the retainer of the present invention collects the combustion products in the gas ejected from the through-hole with the cylindrical portion and/or the partition wall thereof. When the combustion products in the gas ejected from the through-hole is collected by the cylindrical portion, the cylindrical portion is formed in such a size and shape that the combustion product can be collected, and intersection angle with the gas ejected from the through-hole is adjusted. In order to collect the combustion products more satisfyingly, it is preferable that the cylindrical portion is formed into a size and shape capable of covering at least a communication hole of the inner cylindrical member.

The retainer comprises the cylindrical portion and the flange-shaped partition wall integrally formed with the cylindrical portion, and preferably, the partition wall is formed into a shape and size capable of defining at least the end of the first combustion chamber in the axial direction. Therefore, the partition wall of the retainer has to be formed into a shape and size capable of closing at least the end of the first combustion chamber. It is possible to arbitrarily form the retainer into a shape and size capable of dividing the coolant means disposed outside the combustion chamber in the radial direction or form into a shape and size capable of dividing the entire outer space of the inner cylindrical member in the housing into upper and lower portions, depending upon the balance of the entire structure in the gas generator. The coolant means is made of a laminated wire mesh or expanded metal or the like, and has a function to purify or cool the gas generated by combustion of the gas generating agent.

Preferably, a part of the cylindrical portion is formed into a shape and size capable of fitted outside the inner cylindrical member. If the cylindrical portion is used in a gas generator in which annular coolant means is accommodated in the housing, the cylindrical portion is formed into such a shape and size that a part of the cylindrical portion is fitted to an inner peripheral surface or an outer peripheral surface of the annular coolant means or an inner peripheral surface of the housing.

This retainer includes at least the cylindrical portion and the partition wall. The cylindrical portion is formed into a substantially cylindrical shape, and the partition wall is annular and an one end portion is formed into an outwardly or inwardly extending flange-like shape. Further, an engaging portion which engages the inner cylindrical member can be formed into an inwardly extending flange-like shape at the other end of the cylindrical portion. If the retainer is fitted outside the inner cylindrical member having the through-hole, preferably, the cylindrical portion faces the through-hole, and the cylindrical portion has a size to cover the through-hole. In other words, the cylindrical portion is positioned with a distance from the inner cylindrical member at least in the vicinity of the through-hole, and faces the through-hole without closing the same.

The present invention also provides a gas generator for an airbag that utilizes the above retainer. Namely, the present invention provides a gas generator for an air bag comprising, a cylindrical housing having a gas discharging port, an inner cylindrical member having a cylindrical peripheral wall provided with a through-hole, at least one of ignition means and a gas generating agent disposed inside the inner cylindrical member, and a retainer having a cylindrical portion surrounding a portion of the inner cylindrical member and a flange-shaped partition wall integrally formed with the cylindrical portion, wherein the cylindrical portion faces an outer peripheral surface of the cylindrical peripheral wall with a distance there between, at least one of the cylindrical portion and the partition wall changes a flow of a gas ejected from the through-hole, and collects combustion products included in the gas.

In the gas generator for the air bag in which a first combustion chamber for accommodating a gas generating agent is provided outside the inner cylindrical member, preferably, the partition wall of the retainer is formed into a shape and size capable of defining at least an end of the first combustion chamber in the axial direction, and the cylindrical portion is formed into a shape and size capable of fitting outside the inner cylindrical member.

A step-notched portion is formed by stepwisely notching the outer peripheral surface of the inner cylindrical member close to closure shell, and an inwardly extending flange-shaped engaging portion is formed at an end of the cylindrical portion of the retainer. The engaging portion is engaged to the step-notch portion, such that the inner cylindrical member and the retainer can be combined. In this case, even when the retainer receives a pressure of a working gas generated in the first combustion chamber at activation of the gas generator, the retainer is unfailingly supported and fixed by the inner cylindrical member. Thus, it is possible to easily and reliably control the length of the first combustion chamber by this retainer.

The present invention can be realized by the gas generator in which the inner cylindrical member is disposed in the housing, the ignition means is disposed inside the inner cylindrical member, the first combustion chamber is provided outside the inner cylindrical member in the radial direction of the gas generator, and flames from the ignition means disposed inside the inner cylindrical member passes through the through-hole and ejected into the first combustion chamber. Therefore, the present invention can be realized regardless of other structures, for example, whether two combustion chambers are provided in the housing, a layout thereof, and the number of ignition means. In other words, the present invention can be realized even by the gas generator in which the combustion chamber is provided outside the inner cylindrical member and no combustion chamber is provided inside the inner cylindrical member. In this case, the ignition means can be accommodated inside the inner cylindrical member.

In a general aspect of the gas generator according to the present invention, the ignition means is disposed inside the inner cylindrical member, and the first combustion chamber is provided outside the inner cylindrical member. The through-hole (hereinafter, referred to as "flame-transferring port") for ejecting flames generated by an actuation of the ignition means into the first combustion chamber is formed in the cylindrical peripheral wall of the inner cylindrical member. The gas generating agent ("first gas generating agent" hereinafter) in the first combustion chamber is ignited and burnt by the flames ejected from the flame-transferring port.

According to the gas generator of the present invention that utilizes the retainer having the partition wall, the length of the combustion chamber can be controlled by the retainer, so that, by appropriately adjusting the shape and location of the retainer, it is possible to shorten the length of the first combustion chamber. As a result, flames ejected from the flame-transferring port can be spread over the entire first combustion chamber, and the first gas generating agent accommodated in the first combustion chamber can effectively be ignited. When the retainer is disposed adjacent to the end of the first combustion chamber, the flow-path through which a gas passes can be formed at the other side of the retainer with respect to the first combustion chamber.

If the retainer is disposed as described above and the length of the first combustion chamber is adjusted to enhance the ignition performance of the first gas generating agent, even when the first gas generating agent does not have a satisfying ignition performance, the ignition performance can be compensated. In other words, by controlling the shape of the first combustion chamber or an arrangement of a flame-transferring port, the gas generating agent that does not have a satisfying ignition performance can be used as the first gas generating agent. Improvement in the ignition performance of the gas generating agent can be measured, for example, by the time when the maximum pressure inside the gas generator at activation can be obtained, or a tank curve (pressure time curve in 60-liter tank) obtained by the 60-liter tank test (tank combustion test).

The gas generator can constitute an air bag apparatus having an impact sensor for detecting an impact and actuate the gas generator, an air bag to which a gas generated in the gas generator is introduced, and a module case for accommodating the air bag.

The gas generator is accommodated in the module case together with the air bag (bag body) for discharging a generated gas to inflate the air bag, and the module case is provided with a pad module.

In the air bag apparatus, the gas generator is actuated when the impact sensor detects an impact and a gas is discharged from the gas discharging port of the housing. The working gas flows into the air bag and thereby, the air bag ruptures the module cover and inflates to form a cushion between a passenger and a hard structure in a vehicle to absorb the impact.

In the gas generator of the present invention, if the second gas generating agent generates solid combustion products such as fluid or semifluid, by arranging the retainer of the present invention to face the through-hole in the inner cylindrical member, the solid combustion products can be collected by the retainer. By collecting the solid combustion products by the retainer in this manner, the amount of heat of the working gas generated by the combustion of the second gas generating agent is reduced, and as a result, it is possible to reduce the amount of coolant means and cooling ability thereof used for cooling the gas.

When the retainer is fixed to the inner cylindrical member by being hooked onto a step portion formed in an inner cylindrical member and by being interposed between the first and second coolant means, gases generated in the respective combustion chambers do not leak into the other chambers. In this case, since the retainer can be disposed without being press-inserted, the assembling of the gas generator can be facilitated. Further, the retainer is pushed towards the step portion of the inner cylindrical member by the combustion pressure of the first gas generating agent, they can be more tightly attached to each other.

When the coolant means is divided by the retainer and the gases generated in the respective combustion chambers pass through different coolant means, the coolant means is independent from each other, and thereby the operation output of the gas generator can be adjusted easily.

Further, the present invention provides a gas generator for an air bag in which two combustion chambers are provided in the housing and combustion degrees of the gas generating agents in the respective combustion chambers can independently be adjusted, and that can be produced easily and smaller.

The present invention provides gas generator for an air bag comprising, a housing having a gas discharging port, an inner cylindrical member having a cylindrical peripheral wall, two combustion chambers separated by the inner cylindrical member, gas generating agents stored in the respective chambers, wherein gases generated in the respective combustion chambers pass through different flow-paths and then, discharged from the gas discharging port.

The inner cylindrical member includes a cylindrical peripheral wall, and the wall defines the combustion chamber. Generally, ignition means provided to ignite the gas generating agent is preferably accommodated inside the inner cylindrical member. Only a single inner cylindrical member is disposed in the housing, and preferably, the combustion chambers are defined inside and outside the inner cylindrical member. It is preferable that all the ignition means is accommodated inside the inner cylindrical member. In this case, the inner cylindrical member defining the combustion chambers and the inner cylindrical member accommodating the ignition means are the same (that is, a single cylindrical member).

The flow-path directs the flow of the working gas inside the housing. Because the flow-paths for the gases generated in the respective combustion chambers are different from each other, the path that the gas flows from one combustion chamber is different from the path that the gas flows from the other combustion chamber. Therefore, if the gas generated in the one combustion chamber directly passes through the coolant means provided outside the chamber, the respective flow-paths of the gases are different from each other as long as the gas generated in the other combustion chamber does not follow through the flow-path for the gas generated in the one combustion chamber.

As described above, by making separate flow-paths for the gases from the respective combustion chambers, it is possible to easily adjust the generation of gases in the respective combustion chambers.

By dividing the two combustion chamber with the inner cylindrical member the gas generator can be reduced in size and combustion degree of the gas generating agent in the combustion chamber can be independently adjusted at each chamber.

The present invention also provides a gas generator in which a gas generated in one of the two combustion chambers reaches a gas discharging port without flowing into the other combustion chamber. With this structure, the gas generated in one of the combustion chambers does not affect the combustion of a gas generating agent in the other combustion chamber, and the combustion of the gas generating agent in each combustion chamber can be independently adjusted.

If the housing is defined such that the gas generated in one of the combustion chambers passes through the flow-space defined by the other combustion chamber, the gas generated in one of the combustion chambers does not flow into the other combustion chamber. This flow-path can be, for example, divided by the retainer defining the end of the other combustion chamber.

In the gas generator mentioned above, the gases generated in the respective combustion chambers can be made to reach the gas discharging port through different coolant means. Also, the gases can be made to reach different gas discharging ports.

When different gas discharging ports or coolant means are provided for the gases generated in the respective combustion chambers, naturally, these gas discharging ports or coolant means have to be provided to correspond to the respective combustion chambers. In other words, exclusively for the working gas generated in one combustion chamber, the gas discharging port is provided.

When different gas discharging ports or coolant means are provided for the gases generated in the respective combustion chambers, a flow-path for the gas is formed in the housing so that the gas generated in one of the combustion chambers passes through the flow-path. Also in this case, two flow-paths may be formed in the housing so that the gases generated in the respective combustion chambers pass through the different flow-paths.

For example, the flow-path communicating with one of the combustion chambers can be obtained such that, after a retainer is provided in the other combustion chamber to define an end portion of the other combustion chamber, a space is defined at the other side of the retainer with respect to the other combustion chamber. In this case, at least a partition wall for defining an end of the other combustion chamber has to be provided with the retainer, and additionally, a structure for supporting and fixing the retainer inside the housing also has to be provided. An example of such a retainer can be obtained by integrally forming a cylindrical portion in a substantially cylindrical shape and an outwardly or inwardly extending flange-shaped partition wall. The retainer obtained in this manner can be supported and fixed inside the housing by engaging the cylindrical portion outwardly or inwardly with a member arranged on an inner wall portion of the housing or inside the housing.

The flow-path can also be obtained by a member (e.g., the inner cylindrical member) having a cylindrical peripheral wall for defining the combustion chambers or by changing a structure of the housing.

In the gas generator formed in the above-described manner, the gases generated in the two combustion chambers reach the coolant means or the gas discharging port through different flow-paths. That is, the one combustion chamber and the other combustion chamber communicate with each other spatially through the coolant means, but the working gas generated in one of the combustion chambers never affect the combustion of the gas generating agent accommodated in the other combustion chamber. Therefore, even if both the combustion chambers communicate with each other through a little gap, the generation of the gases in each combustion chamber can be independently adjusted as long as the gas generated in one of the combustion chambers does not affect the combustion of gas generating agent accommodated in the other combustion chamber.

Accordingly, in the gas generator of the present invention, when the gas generating agent in one of the combustion chambers is burnt, the gas generating agent in the other combustion chamber burns without receiving any influence of combustion pressure or combustion heat generated in said one combustion chamber. As a result, it is possible to adjust the combustion of the gas generating agent accommodated in each combustion chamber independently, i.e., it is possible to easily and reliably adjust the operation performance of the gas generator.

Further, by forming different paths from the respective combustion chambers to the coolant means, flames can be hardly transferred between the combustion chambers. As a result, when a seal tape is provided to seal off the combustion chamber from the flow-path, the seal tape in which a rupturing strength is not so high or melting point is low, e.g., aluminum seal tape having metal layer of 80 μm, can be used.

The gas generator of the invention can be realized, for example, by a cylindrical housing comprising a diffuser shell having a cylindrical shape with a top and a gas discharging port, and a closure shell forming an inner space together with the diffuser shell, an inner cylindrical member provided inside the housing and defining a first combustion chamber outside thereof. The inside of the inner cylindrical member is divided by a partition wall, such that the divided portions are adjacent to each other in the axial direction of the gas generator, and one of the divided portions in the diffuser shell side is defined as a second combustion chamber and the other in the closure shell side is defined as an ignition means accommodating chamber. A gas generating agent is charged in each combustion chamber, and ignition means for initiating activation of the gas generator is arranged in the ignition means accommodating chamber. Annular coolant means made of a laminated wire mesh to cool or purify a gas generated in each combustion chamber is disposed outside the first combustion chamber.

In this gas generator, for example, after the retainer is disposed on an end portion of the first combustion chamber to close the end of the first combustion chamber, the flow-path for a gas can be formed between the retainer and an inner surface of the diffuse shell. In this case, the peripheral wall of the inner cylindrical member is provided with a through-hole, and the second combustion chamber and the flow-path communicate each other through the through-hole.

Since two combustion chambers are provided in the gas generator of the present invention, it is preferable that the gas generating agents in the respective combustion chambers can be burnt at a different timing. Therefore, the ignition means in which the activation timings can be arbitrarily differed, for example, using two igniters is optimally used.

The gas generator can constitute an air bag apparatus together with an impact sensor to detect an impact and actuate the gas generator, an air bag to which the gas generated in the gas generator is introduced and a module case for accommodating the air bag.

The gas generator is accommodated in the module case together with the air bag (bag body) for introducing the generated gas to inflate the air bag, and the module case is provided with a pad module.

In the air bag apparatus, the gas generator is actuated upon the impact sensor detecting an impact and the gas is discharged from the gas discharging port of the housing. The gas flows into the air bag and thereby, the air bag ruptures the module cover and inflates to form a cushion between a passenger and a hard structure in a vehicle to absorb the impact.

In the gas generator according to the present invention, although the overall size of the gas generator is limited, the gases generated in the respective combustion chambers can flow towards the coolant means via different flow-paths so that the combustion of the gas generating agent in each combustion chamber is independently adjusted, and thereby the operation output of the gas generator can be easily adjusted. As a result, it is possible to reduce the weight of the coolant means. This becomes remarkable when different coolant means or different gas discharging ports are formed for the respective combustion chambers.

Especially in the gas generator provided with the flow-path by the retainer, it is possible to enhance an ignition of the first gas generating agent in the initial stage of actuation of the gas generator by adjusting a shape of the first combustion chamber provided outside of the inner cylindrical member or by adjusting an ejecting location of flames from the ignition means which ignites the first gas generating agent. In other words, by allowing flames of the ignition means ejected into the first combustion chamber to spread widely in the combustion chamber, more gas generating agents can be ignited than otherwise.

DETAILED DESCRIPTION OF THE PRESENT INVENTION

An embodiment of a generator for an air bag according to the present invention will be explained with reference to the drawings.

Figure 1:
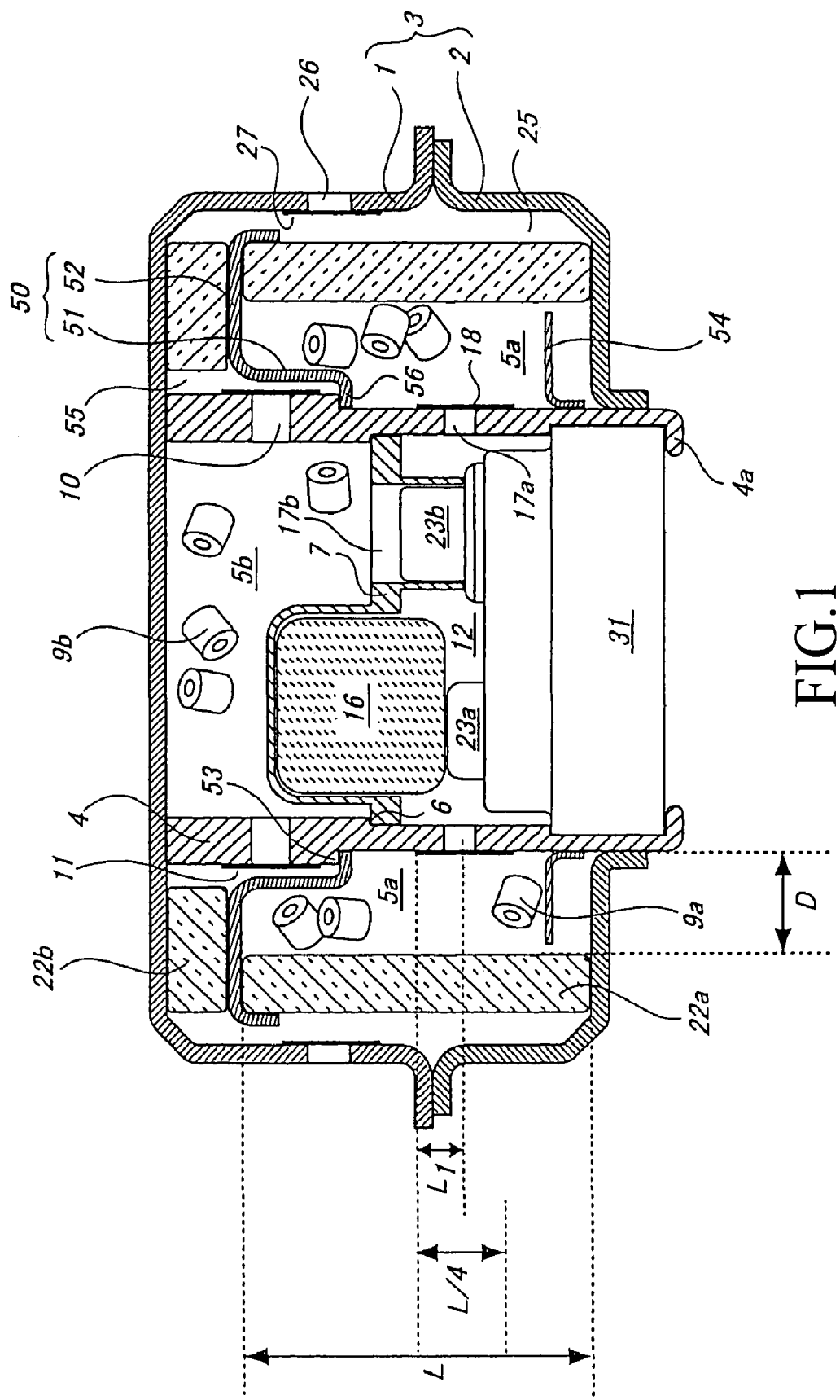
FIG. 1 is a vertical cross-sectional view showing a gas generator for an air bag of one embodiment.

FIG. 1 is a vertical cross-sectional view showing one embodiment of the gas generator for the air bag of the present invention.

The gas generator shown in this embodiment has two combustion chambers in a housing and ignition means provided in each combustion chamber. More specifically, a housing 3, formed by joining a diffuser shell 1 having gas discharging ports 26 and a closure shell 2, defines an inner accommodating space. An inner cylindrical member 4, substantially cylindrical in shape, is disposed inside the housing 3 and defines a first combustion chamber 5a outside thereof. An interior of the inner cylindrical member 4 is divided into two chambers by a partition wall 7. A chamber closer to the diffuser shell 1 is a second combustion chamber 5b and a chamber closer to the closure shell 2 is an ignition means accommodating chamber 12. The partition wall 7 is engaged to a step-notched portion 6 formed in an inner surface of the inner cylindrical member 4. In this embodiment also, a cylindrically formed peripheral wall (i.e., cylindrical peripheral wall) of the inner cylindrical member 4 is formed with a through-hole. In this embodiment, among the through-holes, the one which opens in the second combustion chamber is the communication hole 10, and the other one which opens in the ignition means accommodating chamber 12 is the first flame-transferring port 17a.

A first gas generating agent 9a is charged into the first combustion chamber 5a, and a second gas generating agent 9b is charged into the second combustion chamber 5b. Each of the first and second gas generating agents is ignited and burnt by a actuation of the ignition means and generate a working gas for inflating the air bag. Shapes, compositions, composition ratios, and amounts of the first and second gas generating agents 9a and 9b may be different from each other. Especially in this embodiment, the first gas generating agent 9a includes fuel and an oxidizing agent. Guanidine derivatives or a mixture thereof are used as the fuel. A basic copper nitrate is used as the oxidizing agent. The same material as that of the first gas generating agent is used for the second gas generating agent 9b as well.

A retainer 50 having a cylindrical portion 51 that surrounds a cylindrical peripheral wall of the inner cylindrical member and an annular partition wall portion 52 is disposed at an upper end of the first combustion chamber 5a close to the diffuser shell 1. The partition wall portion 52 defines the length (height) of the first combustion chamber 5a. That is, as shown in FIG. 1, the retainer 50 comprises the cylindrical portion 51 facing the inner cylindrical member at a predetermined distance and the annular partition wall portion 52 which is bent outwardly into a flange-like shape from the cylindrical portion 51. Further, an inwardly directed flange-like engaging portion 56 is formed on the cylindrical portion 51 at a side opposite to the partition wall portion 52. An outer periphery of the inner cylindrical member is formed with a step-notched portion 53 formed by stepwisely notching the outer periphery in the closure shell 2 side. The retainer 50 is disposed and fixed by engaging the engaging portion 56 to the step-notched portion 53. When the first gas generating agent is burnt at activation of the gas generator, the retainer 50 is pushed in an engaging direction by the step-notched portion 53 by the combustion pressure, and a fixed state and ignition state thereof become further reliable.

In this embodiment, since the cylindrical portion 51 is disposed to face the communication hole 10 without closing the same, the working gas generated by the combustion of the second gas generating agent 9b and discharged from the communication hole 10 once collides against the cylindrical portion 51. Therefore, if the second gas generating agent 9b generates solid combustion products such as fluid or semi-fluid at the time of the combustion, the combustion products collide against the cylindrical portion 51 and are removed from the working gas. As a result, when the gas generating agent generating such solid combustion products is used as the second gas generating agent 9b, the solid combustion products are largely removed by the cylindrical portion 51, so that an amount of the later-described second coolant means 22b and a thickness thereof in the radial direction can be reduced.

By adjusting the location of the step-notched portion 53 or the position of the partition wall portion 52, an inner shape, a capacity and the like of the first combustion chamber 5a can be adjusted. Therefore, it is possible to adjust a ratio (D/L) of a radial average distance (D) of the combustion chamber 5a to an axial average length (L) of the combustion chamber 5a to be in the range of 0.2 to 2.0, preferably of 0.4 to 1.0 by adjusting the shape or position of the retainer 50. In this embodiment, a lower end surface of the first combustion chamber 5a at the closure shell 2 side is defined by an inner surface of the closure shell 2, and the gas generating agent 9*a* in the combustion chamber 5*a* is supported by an underplate 54.

The retainer 50 shown in this embodiment defines a flow-path 55 between the retainer 50 and the diffuser shell 1 so that a working gas generated by combustion of the second gas generating agent 9*b* passes through the flow-path. The flow-path 55 and the second combustion chamber 5*b* can communicate with each other through a communication hole 10 formed in a partition wall of the inner cylindrical member 4. In other words, the communication hole 10 is closed by a later-described seal tape 11, and the seal tape is ruptured by combustion of the second gas generating agent to make the flow-space 55 communicate with the second combustion chamber 5*b*.

In the gas generator of the present embodiment, flames from the combustion of the first gas generating agent is not ejected toward an exit (i.e., the communication hole 10) of the second combustion chamber. Therefore, in selecting the seal tapes for closing the communication hole 10 between the second combustion chamber 5*b* and the flow-path, it is unnecessary to consider influences by the flames. Accordingly, even an aluminum seal tape having a lower melting point than that of stainless steel can be used.

The ignition means including two igniters 23*a* and 23*b* and a transfer charge 16 charged into an aluminum cup is accommodated in the ignition means accommodating chamber 12. The two igniters 23*a* and 23*b* are fixed to a collar assembly 31. The collar assembly 31 is fixed by crimping a lower end 4*a* of the inner cylindrical member 4. The first igniter 23*a* and the second igniter 23*b* are accommodated in spaces defined by the partition wall 7 respectively. The transfer charge 16 is arranged above the first igniter 23*a* in the space where the first igniter 23*a* is accommodated. The igniters 23*a* and 23*b* stored in the ignition accommodating chamber 12 are arranged such that flames generated by activation of the first igniters 23*a* do not mix with flames generated by activation of the second ignites 23*b*.

The space in which the first igniter 23*a* is accommodated and the first combustion chamber 5*a* can communicate with each other through a first flame-transferring port 17*a* formed in a peripheral wall of the inner cylindrical member 4. The first flame-transferring port 17*a* is formed such that a distance $L_1$ from the center of the axial average length measured from the inner bottom surface of the closure shell in the first combustion chamber to the center of the first flame-transferring hole 17*a* is not more than ¼ of the axial average length L in the first combustion chamber, and preferably, the flame-transferring port 17*a* is formed at the center of the first combustion chamber 5*a* in the axial direction. With this design, flames caused by combustion of the transfer charge 16 is ejected to the substantially central position of the first combustion chamber 5*a*, and the flames of the transfer charge 16 can reach the entire first combustion chamber 5*a*.

Meanwhile, the space where the second igniter 23*b* is accommodated and the second combustion chamber 5*b* communicate with each other through a second flame-transferring port 17*b* formed in the partition wall 7. The second combustion chamber 5*b* can communicate with a flow-path 55 defined by the retainer 50 through the communication hole 10 formed in the inner cylindrical member 4.

Working gases generated by combustion of the first gas generating agent 9*a* and the second gas generating agent 9*b* passes through annular coolant means 22*a*, 22*b* comprising laminated wire mesh or expanded metal to be discharged from a gas discharging port 26. Especially in this embodiment, the working gases generated from gas generating agents 9*a* and 9*b* pass through different coolant means 22*a* and 22*b*. More specifically, the first coolant means 22*a* is disposed radially in the outside of the first combustion chamber 5*a*, the second coolant means 22*b* is disposed radially in the outside the second combustion chamber 5*b* through the flow-path 55, and both the coolant means 22*a* and 22*b* are separated from each other by the retainer 50. In the gas generator shown in FIG. 1, the first combustion chamber is formed adjacent to the inner surface of the first coolant means.

Therefore, in the gas generator shown in this embodiment, the transfer charge 16 is burnt by an actuation of the first igniter 23*a*, and its flame passes through the first flame-transferring port 17*a* and ejected into the first combustion chamber 5*a*. Consequently, the first gas generating agent 9*a* is ignited and burnt to generate the working gas, the working gas passes through the first coolant means 22*a*, reaches a gap 25*b*, and discharges from the gas discharging port 26. On the other hand, when the second igniter 23*b* is actuated, its flame passes through the second flame-transferring port 17*b* and is ejected into the second combustion chamber 5*b* to ignite and burn the second gas generating agent 9*b*. The working gas generated by the combustion of the second gas generating agent 9*b* is ejected outwardly from the communication hole 10 in the radial direction, and its direction is changed by the cylindrical portion 51 of the retainer 50. At the same time, the combustion products included in the working gas collide against the cylindrical portion 51. Consequently, most of the combustion products included in the working gas generated by the combustion of the second gas generating agent 9*b* are removed or reduced. The working gas proceeds to and passes through the flow-path 55 and reaches the second coolant means 22*b*. The working gas is cooled while it passes through the second coolant means 22*b*, and is purified and discharged from the gas discharging port 26 via the gap 25. When different coolant means are used for the respective working gases generated in each combustion chamber, the respective coolant means are independent from each other, so that the actuation output of the gas generator can be adjusted easily.

Further, in the gas generator shown in this drawing, the two coolant means 22*a* and 22*b* are separately disposed, so that the purifying/cooling abilities of the coolant means 22*a* and 22*b* can be controlled respectively in accordance with the generation amount of a working gas generated in the combustion chambers 5*a* and 5*b*. If the second coolant means 22*b* cools the working gas generated by the combustion of the second gas generating agent 9*b*, an inner diameter of the first coolant means 22*a* can be made larger, and thereby, the radial average distance (D) of the first combustion chamber 5*a* can be increased.

Especially in the embodiment shown in FIG. 1, the retainer 50 is formed into the shape having an outwardly extending flange, and the end of the inner wall portion 51 engages the step-notched portion 53 formed in the outer peripheral surface of the inner cylindrical member 4. Since the communication hole 10 is formed to face the inner wall portion 51, the working gas generated by the combustion of the second gas generating agent 9*b* and discharged from the communication hole 10 once collides against the inner wall portion 51 of the retainer. Therefore, for example, if the second gas generating agent 9*b* generates solid combustion products such as a fluid or semifluid at the time of the combustion, the combustion products collides against the inner wall portion 51 and are removed from the working gas.

Further, in the gas generator shown in FIG. 1, the two coolant means 22a and 22b are separately disposed, so that the working gases generated in the respective combustion chambers reach the coolant means 22a and 22b through different flow-paths, and thus the purifying/cooling abilities of the coolant means 22a and 22b can be controlled respectively in accordance with the generation amount of the working gas generated in the combustion chambers 5a and 5b. If the second coolant means 22b cools the working gas generated by the combustion of the second gas generating agent 9b, an inner diameter of the first coolant means 22a can be made larger, and thereby, the radial average distance (D) of the first combustion chamber 5a can be increased.

In FIG. 1, reference numeral 18 represents a seal tape for closing the first flame-transferring port 17a, and reference numeral 27 represents a seal tape for closing the gas discharging port 26. The seal tapes are ruptured when flames or gases pass through the holes or ports. The seal tapes 11, 18, 27 may have a metal layer having a thickness of 10 to 100 μm.

The retainer 50 shown in this embodiment reliably maintains the upper end of the first combustion chamber 5a, defines the flow-path 55, and separates the coolant means 22a and 22b.

Figure 2A:
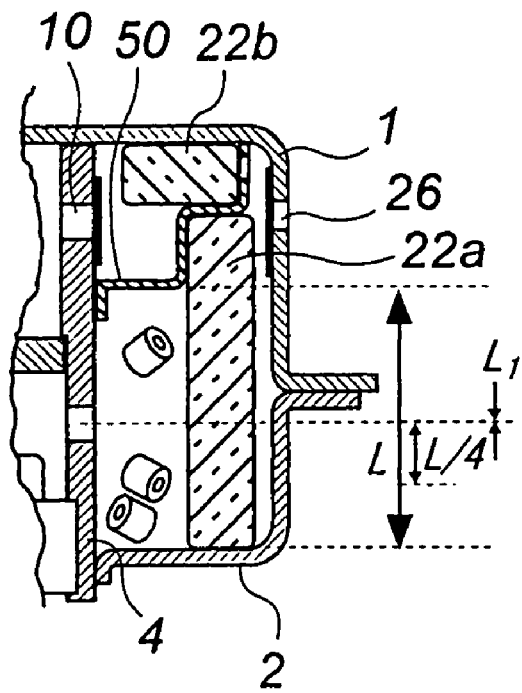
FIGS. 2(a) to (h) are partial vertical cross-sectional views showing gas generators having different retainers from that shown in the embodiment.
Figure 2B:
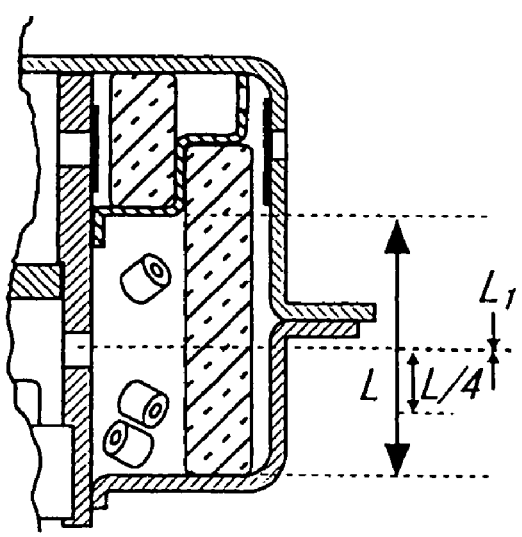
Figure 2C:
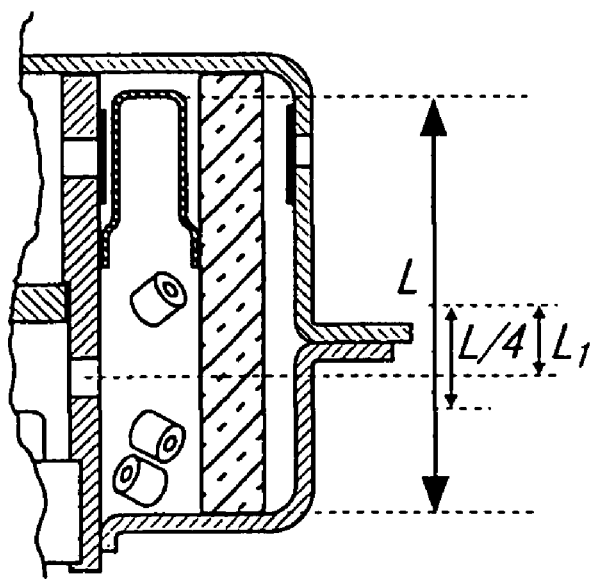
Figure 2D:
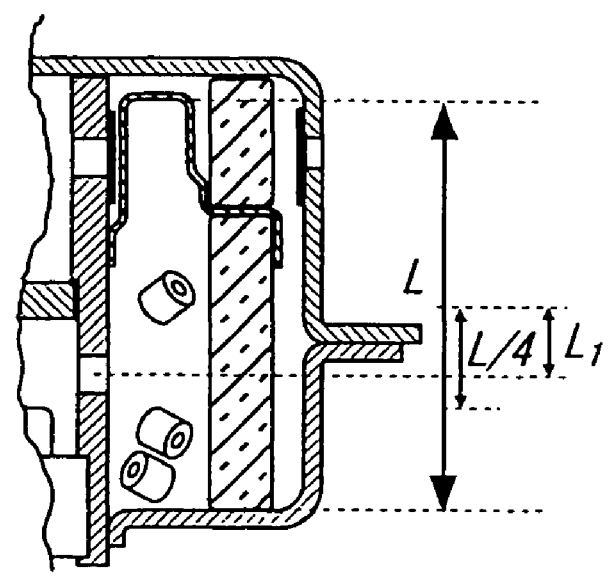
Figure 2E:
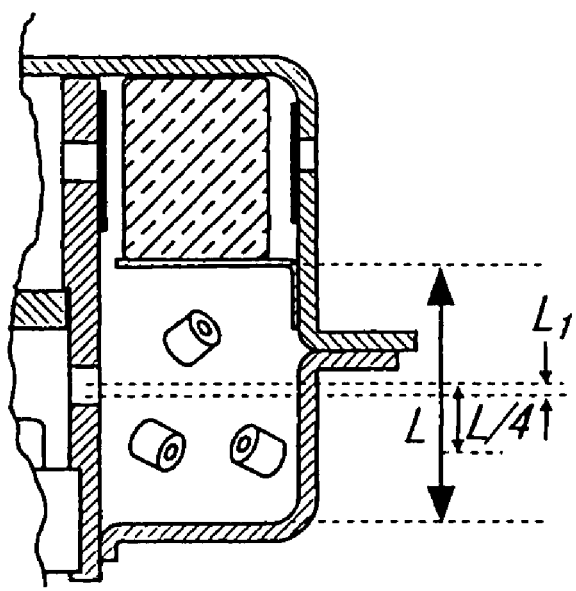
Figure 2F:
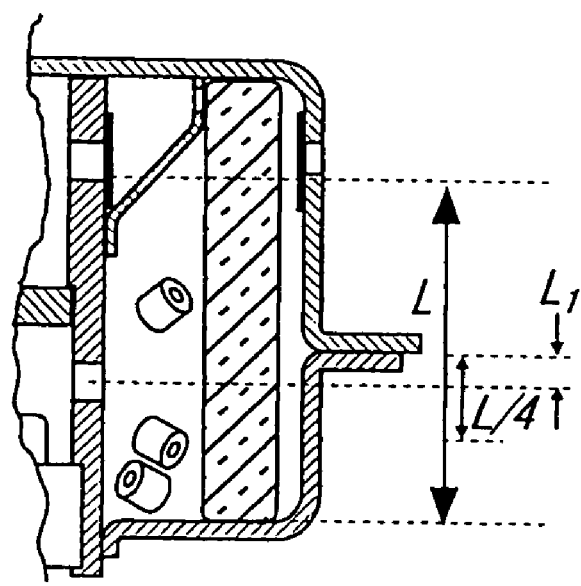
Figure 2G:
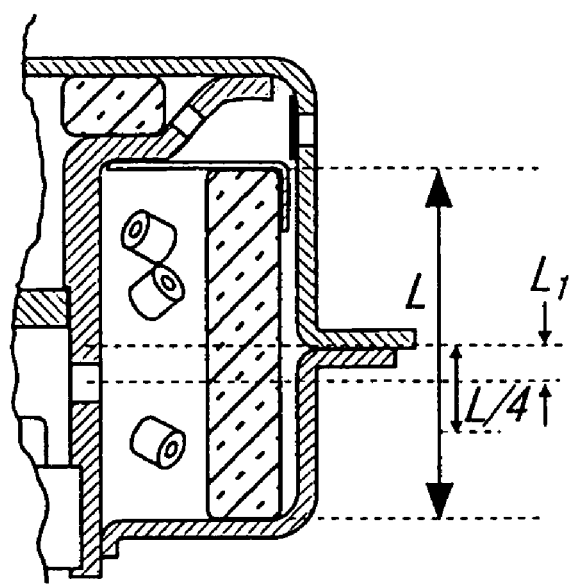
Figure 2H:
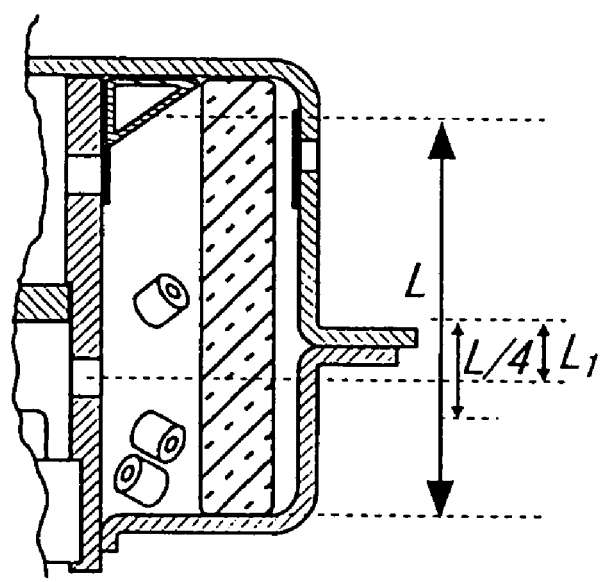

FIGS. 2(a) to (h) are cross-sectional views of essential portions of gas generators in which the axial average length (L) of the first combustion chamber is defined by using retainers having different shapes from that shown in FIG. 1. In all of aspects (a to g) shown in FIG. 2, the axial average length (L) of the first combustion chamber 5a is defined by the retainer 50 disposed close to the upper end of the first combustion chamber. In the gas generator shown in FIGS. 2(a) to (g), the flow-path is provided between the retainer 50 and the diffuser shell 1. In the gas generator shown in FIG. 2(h), the axial length of the first combustion chamber is defined by the retainer 50, but it does not define a flow-path between the retainer 50 and the diffuser shell. In FIG. 2(a), each of the members and the portions is designated with the same reference numeral as that in FIG. 1, and a description thereof is omitted.

Figure 3:
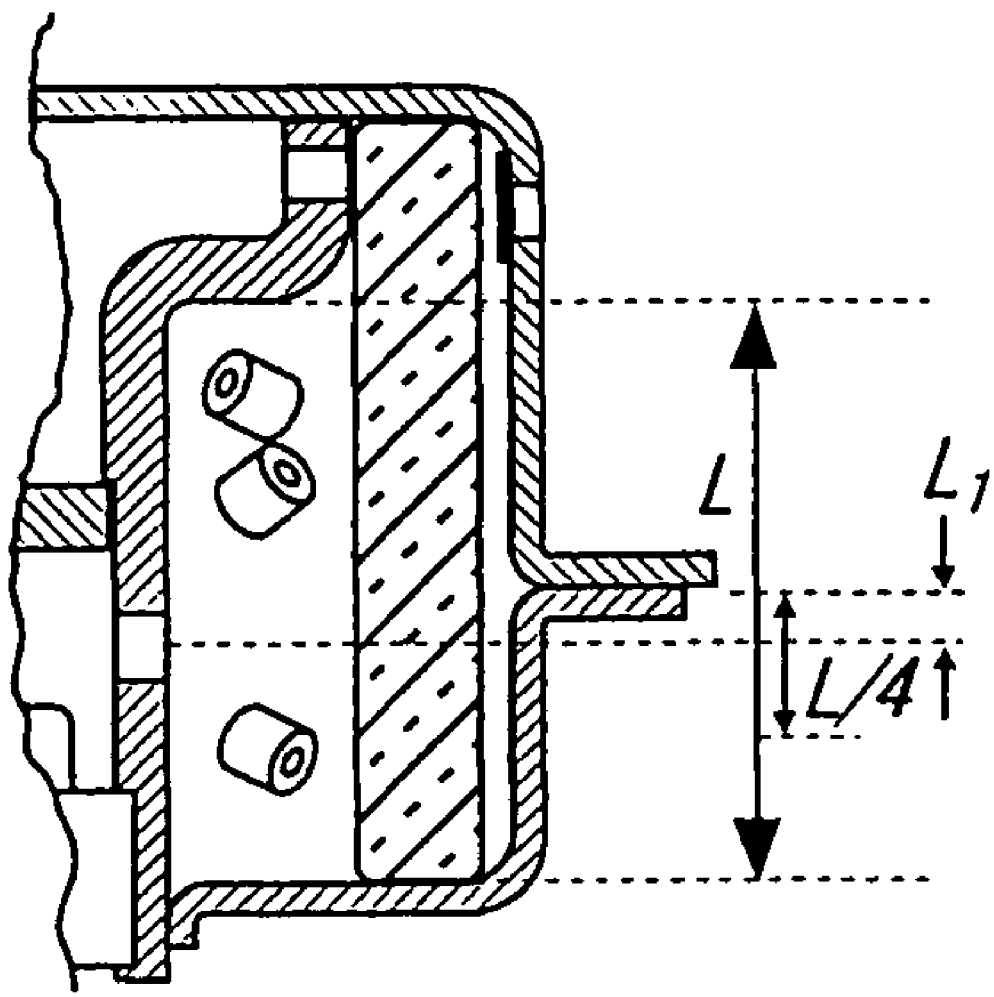
FIG. 3 is a partial cross-sectional view showing a gas generator having an inner cylindrical member different from that shown in FIG. 1.
Figure 4A:
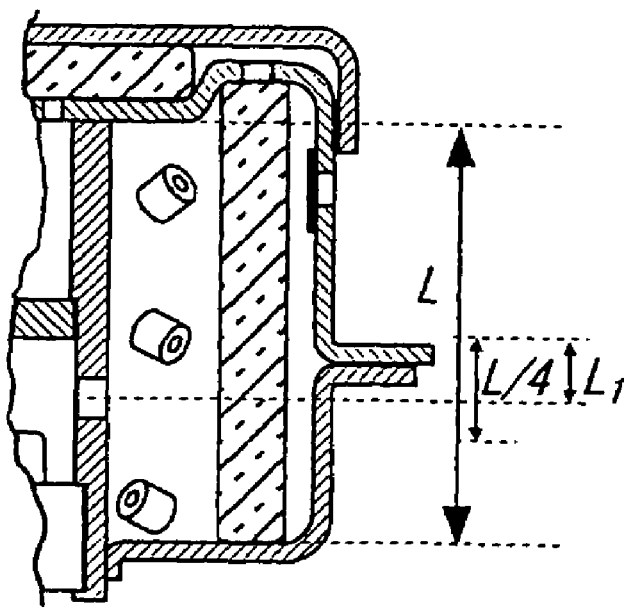
FIGS. 4(a) to (f) are partial vertical cross-sectional views showing variations of the gas generator for the air bag shown in FIG. 1.
Figure 4B:
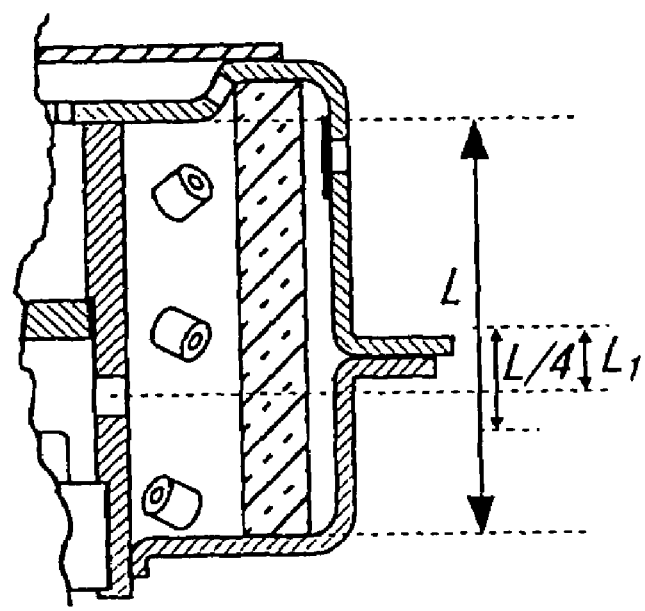
Figure 4C:
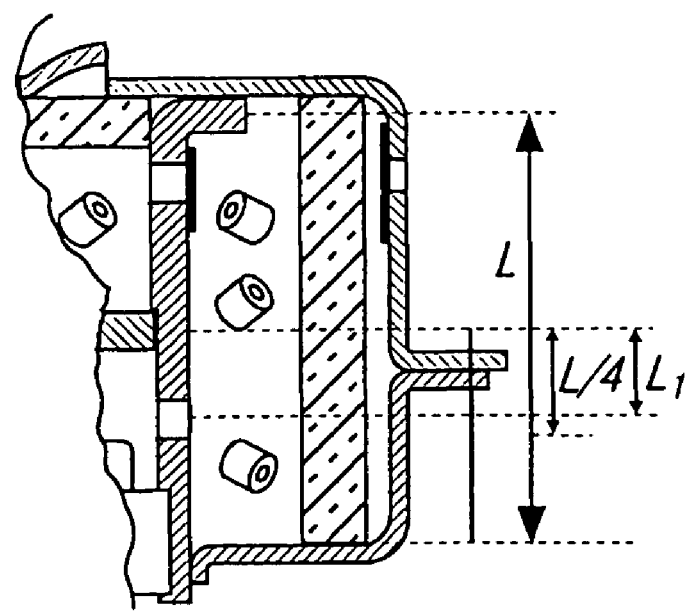
Figure 4D:
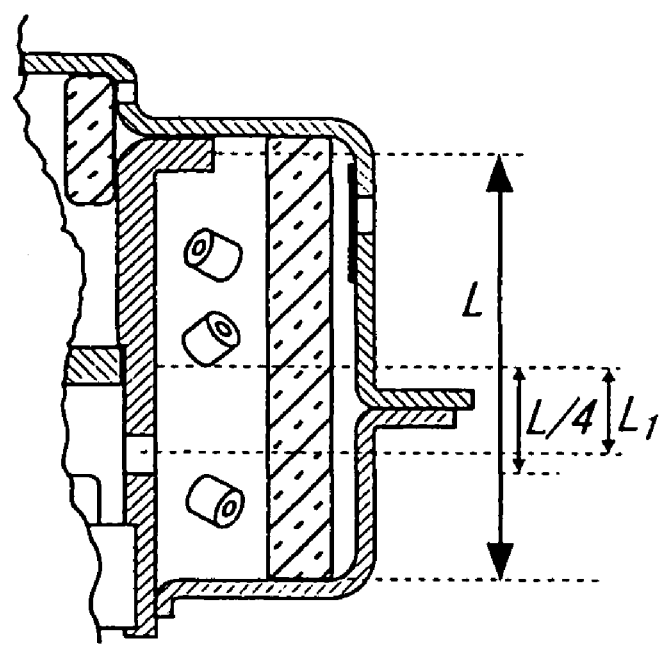
Figure 4E:
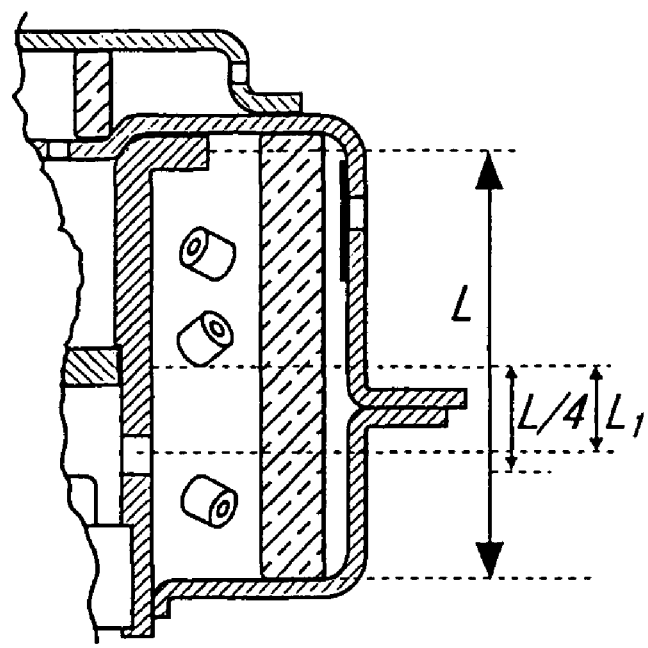
Figure 4F:
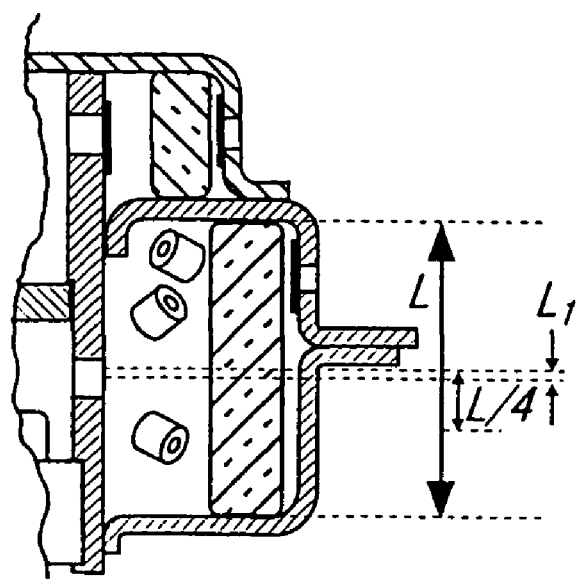

FIG. 3 is a cross-sectional view of an essential portion showing a gas generator in which the axial length of the first combustion chamber is limited by bending the inner cylindrical member 4 into a flange-like shape. In this gas generator, the working gas ejected from the through-hole 10 is directly ejected to the coolant means 22. In FIG. 3, each of the members and portions is designated with the same reference numeral as that in FIG. 1, and a description thereof is omitted.

Further, FIGS. 4(a)–(f) are cross-sectional views of essential portions of gas generators in which the axial average length (L) of the first combustion chamber is limited by an inner surface of the housing.

Figure 5:
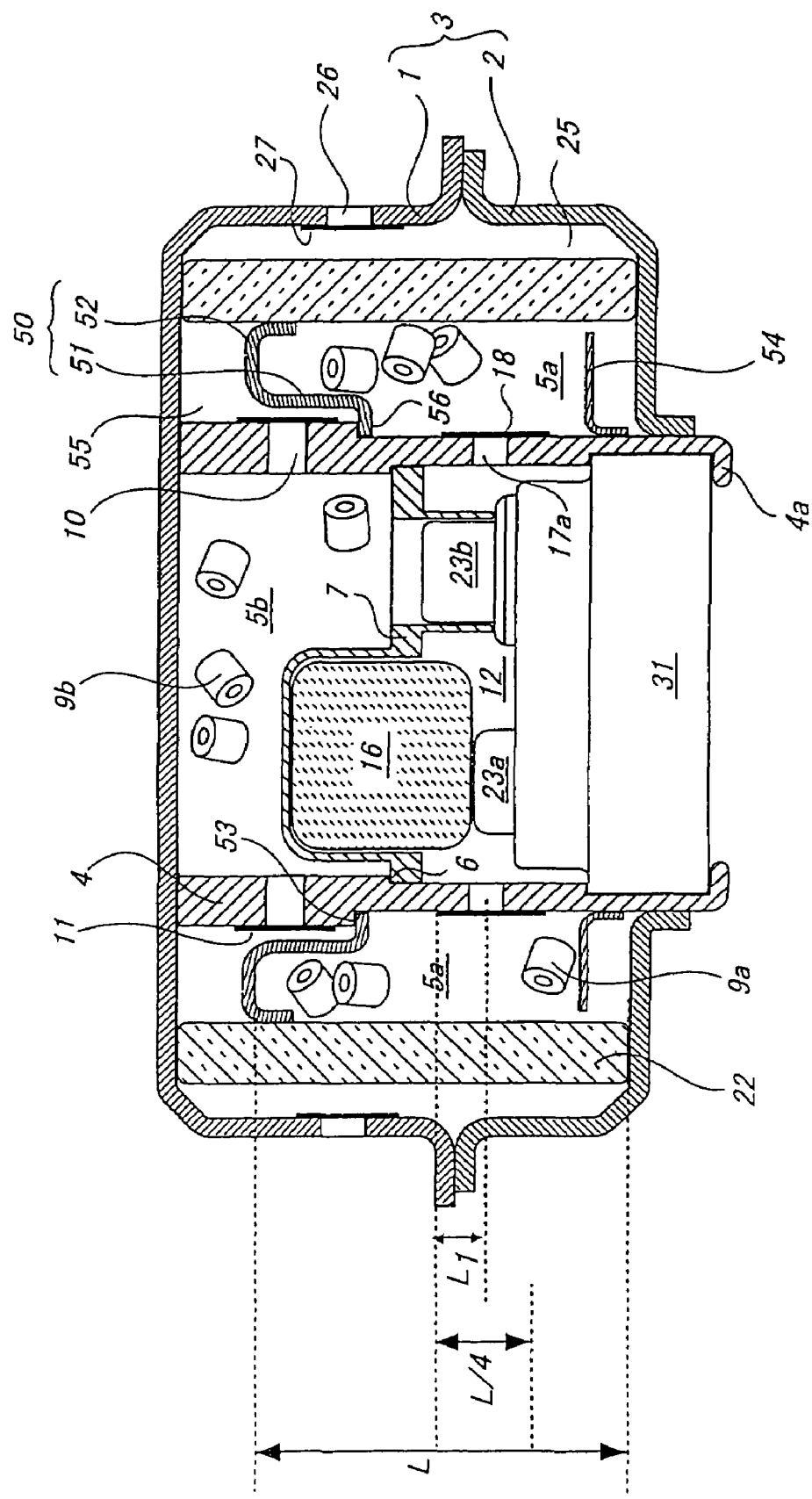
FIG. 5 is a vertical cross-sectional view showing a gas generator for the air bag according to another embodiment.
Figure 6:
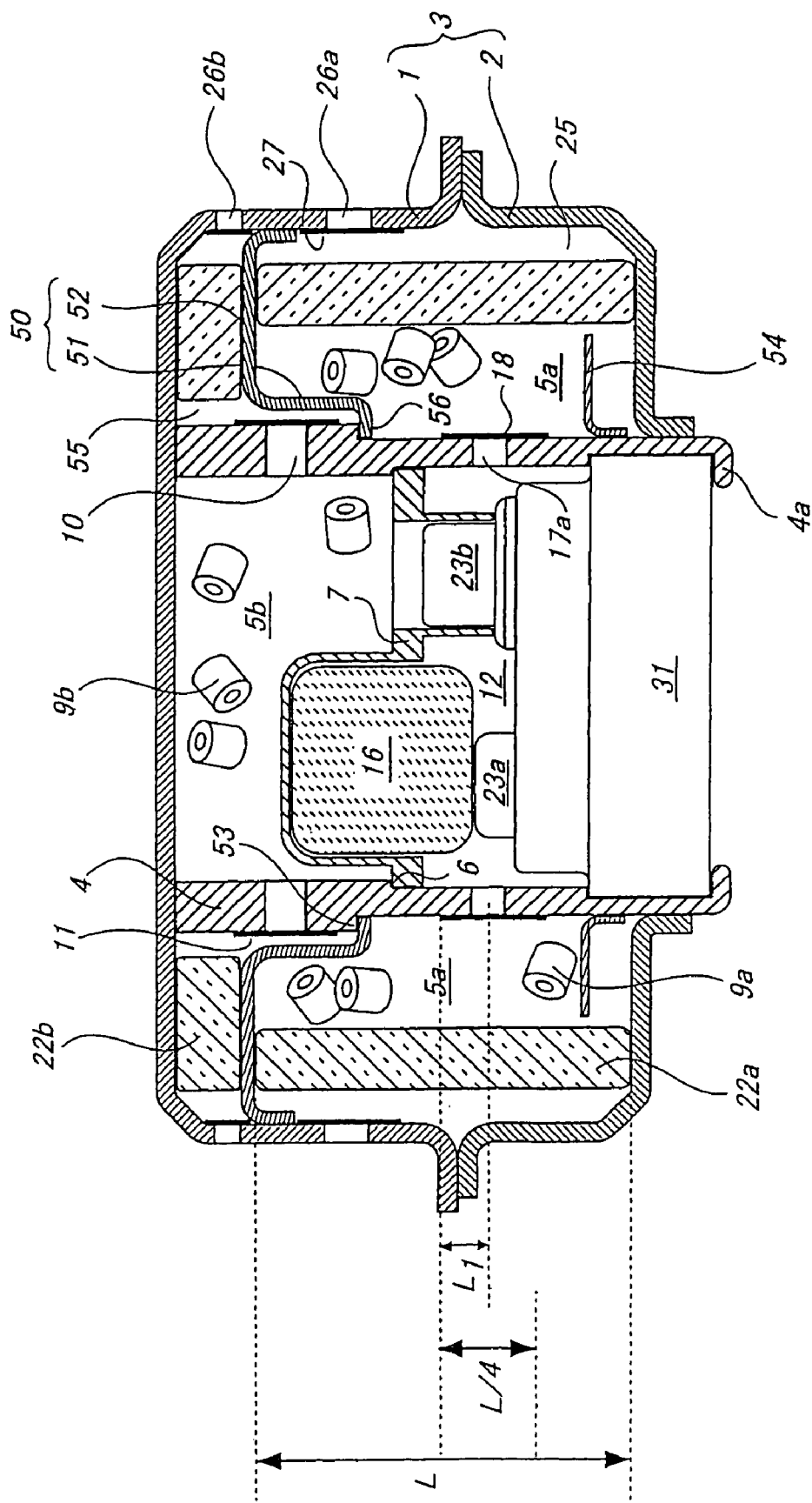
FIG. 6 is a vertical cross-sectional view showing a gas generator for the air bag according to yet another embodiment.

The gas generator for an air bag of the present invention may employ embodiments shown in FIGS. 5 and 6. In FIGS. 5 and 6, each of members and portions is designated with the same reference numeral as that of FIG. 1, and a description thereof is omitted.

The retainer 50 shown in FIG. 5, defines the upper end of the first combustion chamber 5a, and adjusts the axial average length of the first combustion chamber 5a. However, in this embodiment the retainer 50 does not divide the coolant means 22. Therefore, the working gas generated in the second combustion chamber 5b flows into the flow-path 55 through the communication hole 10, the gas the same coolant means 22 as that for the working gas generated in the first combustion chamber 5a passes through, and then passes through the gap 25 and discharged from the gas discharging port 26. In this case, even if the working gas is generated only in the first combustion chamber 5a and the gas generating agent in the second combustion chamber 5b is not yet ignited, the working gas generated in the first combustion chamber 5a opens the gas discharging port 26 and therefore, the gas does not flow into the flow-path 55 through the coolant means 22 and rupture the seal tape 11 which closes the communication hole 10.

The retainer 50 shown in FIG. 6 defines the upper end of the first combustion chamber 5a and adjusts the axial average length (L) of the first combustion chamber 5a. An outer end surface of the retainer 50 abuts against an inner wall surface of the diffuser shell 1 to separate flow-paths for the working gas generated in the first combustion chamber 5a and the working gas generated in the second combustion chamber 5b from each other. Therefore, the working gas generated in the first combustion chamber 5a is discharged from the gas discharging port 26a, and the working gas generated in the second combustion chamber 5b is discharged from the gas discharging port 26b.

Figure 12:
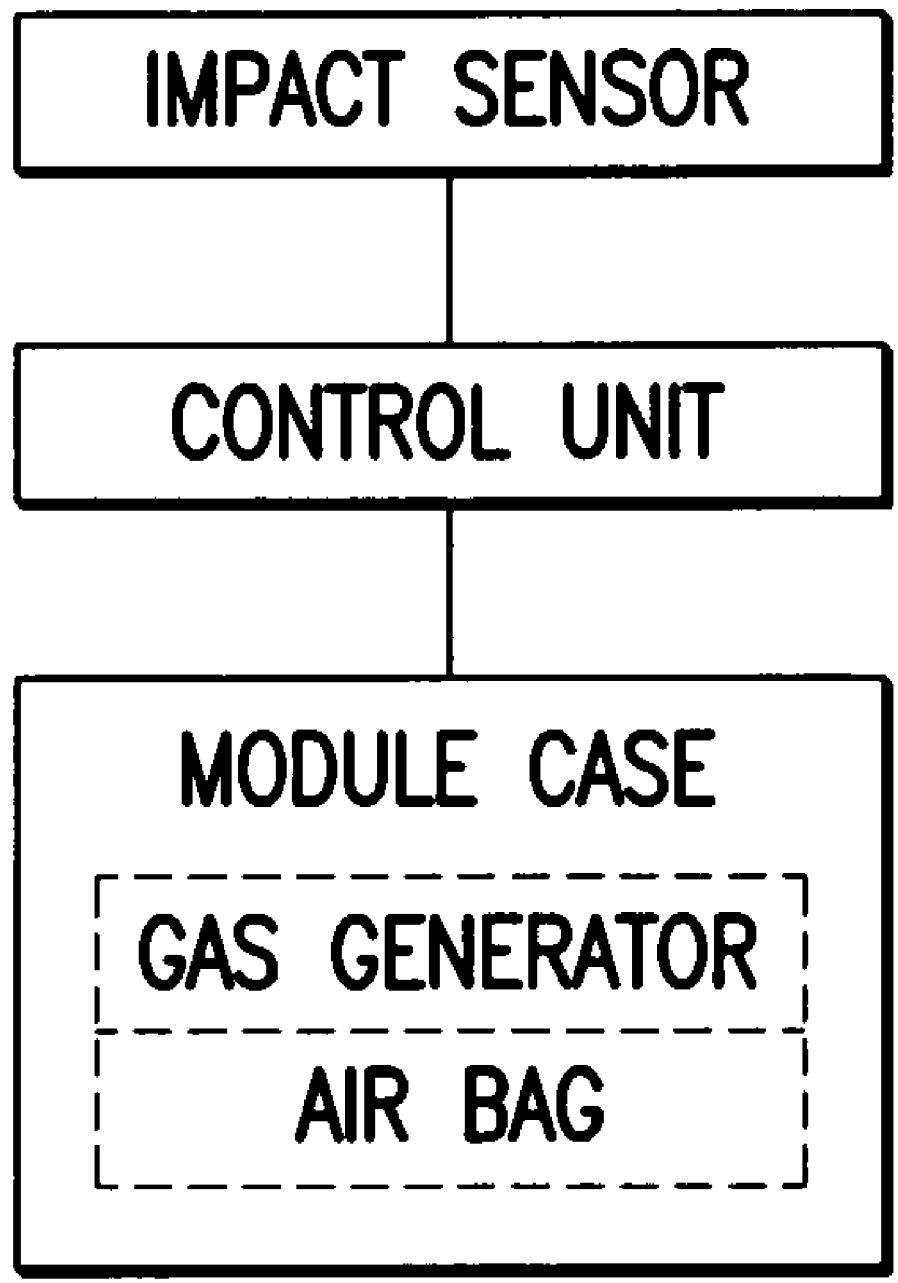
FIG. 12 is a block diagram that shows an airbag apparatus.

As shown in FIG. 12, the air bag apparatus of the present invention using the above-described gas generator comprises actuation signal-outputting means including an impact sensor and a control unit, and a module case including the air bag gas generator 100 and the air bag. The air bag gas generator 100 is connected to the actuation signal-outputting means (the impact sensor and the control unit) on the first and second igniters 23a and 23b side. In the air bag apparatus having such a structure, by appropriately setting an actuation signal outputting condition in the actuation signal outputting means, it is possible to adjust the gas generation amount in accordance with a degree of an impact and to adjust an expansion speed of the air bag. As a structure of other than the gas generator in this air bag apparatus, one disclosed in JP-A No. 11-334517 can be employed.

Therefore, in the gas generator shown in this embodiment, the transfer charge 16 is burnt by actuation of the first igniter 23a, and its flame passes through the first flame-transferring port 17a and is ejected into the first combustion chamber 5a. Consequently, the first gas generating agent 9a is ignited and burnt to generate a working gas, the working gas passes through the first coolant means 22a, reaches a gap 25 and rupture a seal tape 27 to be discharged from the gas discharging port 26. On the other hand, when the second igniter 23b is actuated, its flame is ejected into the second combustion chamber 5b to ignite and burn the second gas generating agent 9b.

The retainer 50 may also be formed as shown in FIGS. 7(a) to (f). If the axial average length (L) of the first combustion chamber is defined previously, the retainers 50 as shown in FIGS. 7(g) and (h) can be employed. That is, as shown in FIGS. 7(a) to (f), the axial average length (L) of the first combustion chamber is defined by the retainer 50, a distance $L_1$ from the center of an axial average length to the center of the flame-transferring port 17a in the first combustion chamber 5a is adjusted to be not more than ¼ of the axial average length (L) of the first combustion chamber 5a.

Figure 7A:
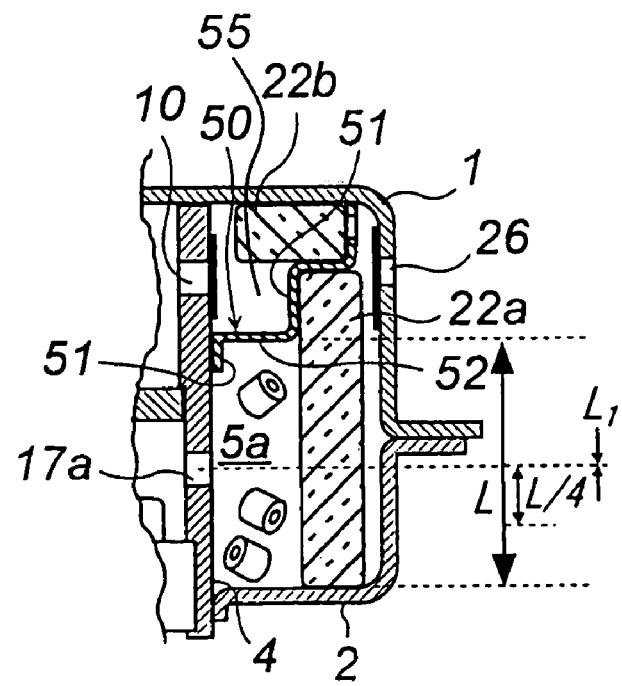
FIGS. 7(a) to (h) are vertical cross-sectional views of an essential portion showing other variations of the retainer.
Figure 7B:
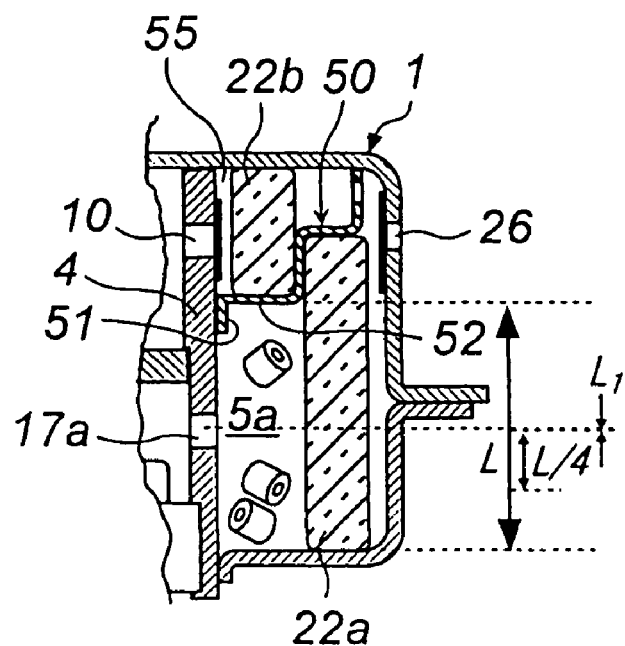
Figure 7C:
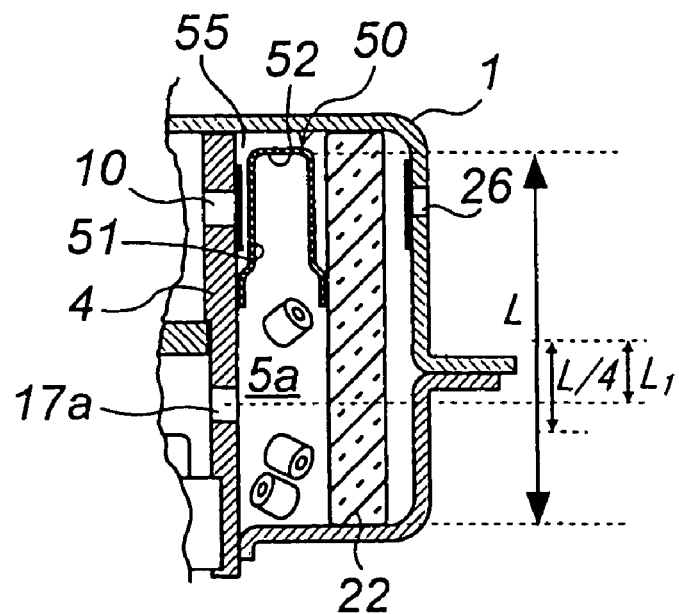
Figure 7D:
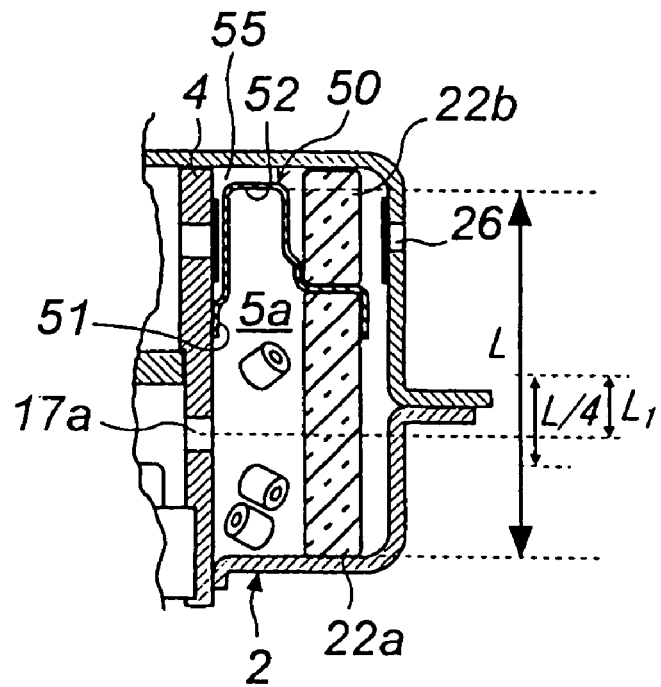
Figure 7E:
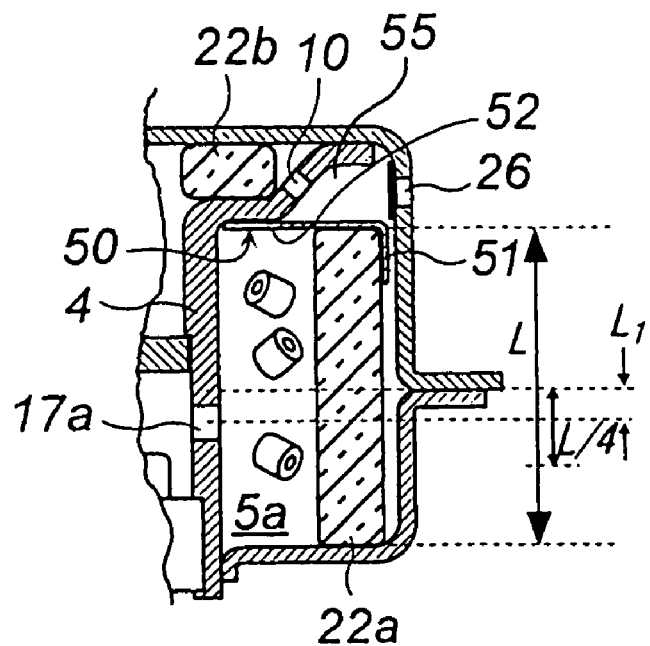
Figure 7F:
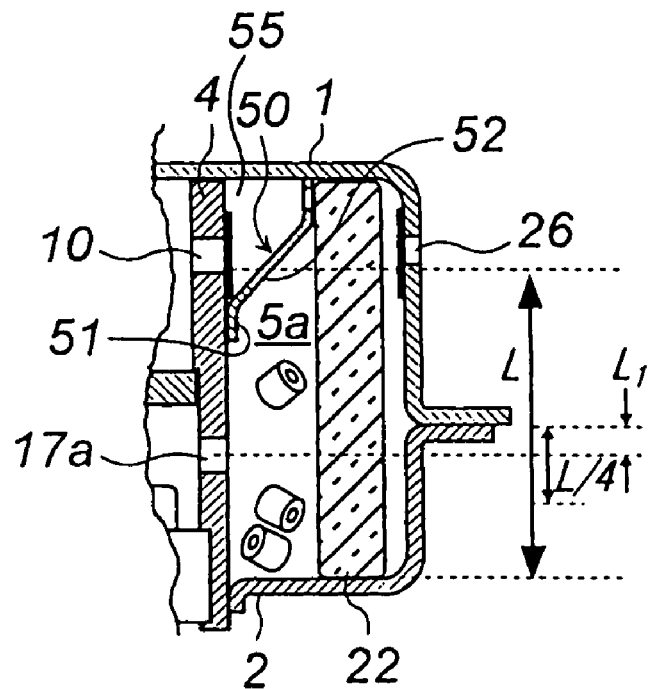
Figure 7G:
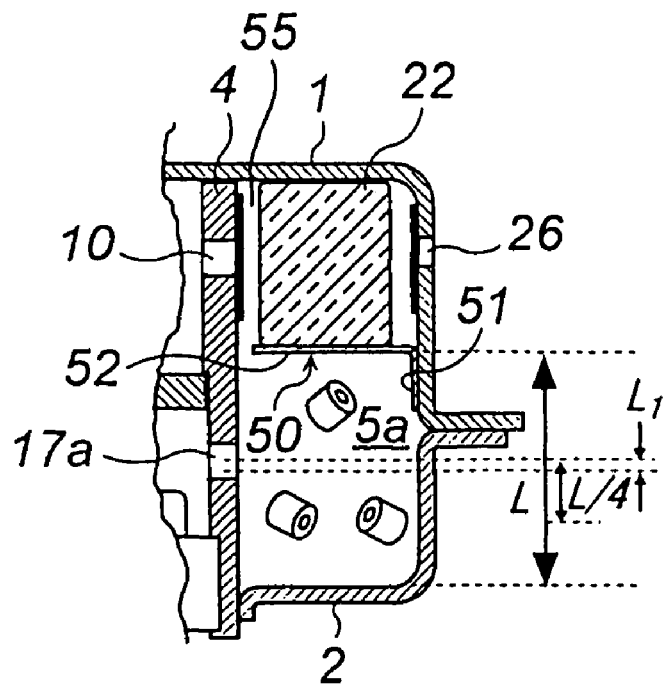
Figure 7H:
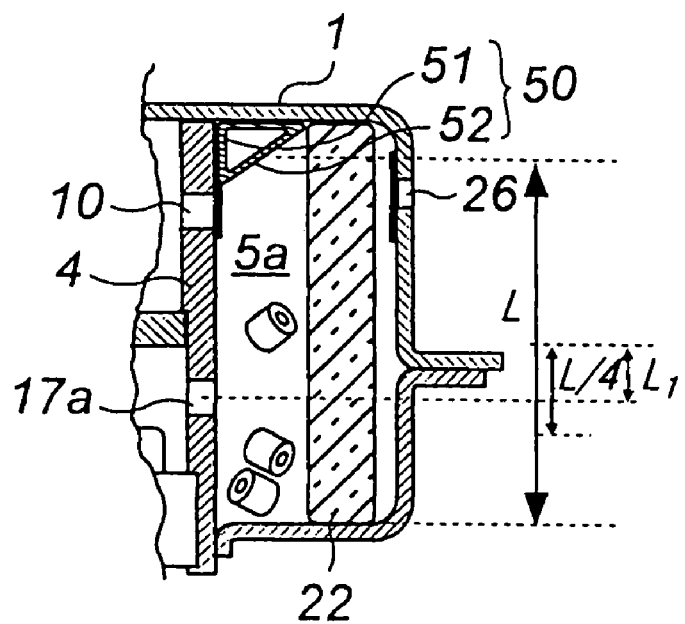
Figure 8A:
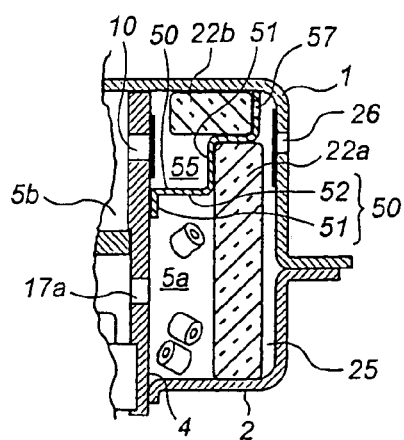
FIGS. 8(a) to (e) are vertical cross-sectional views showing other variations in the gas generator for the air bag.
Figure 8B:
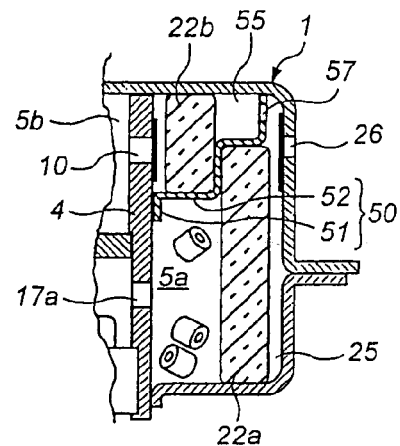
Figure 8C:
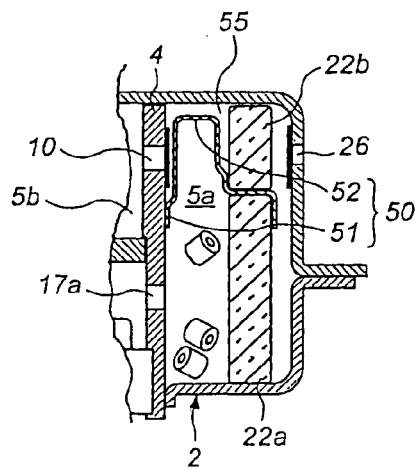
Figure 8D:
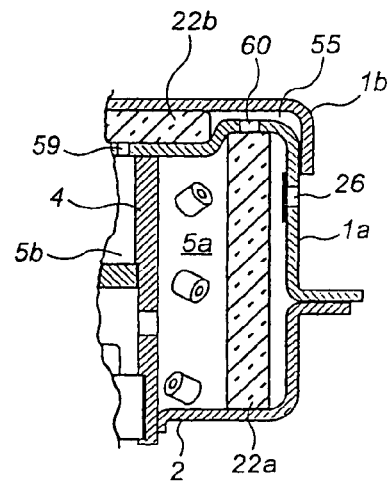
Figure 8E:
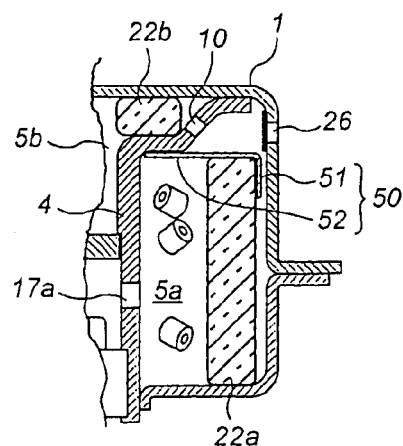
Figure 9A:
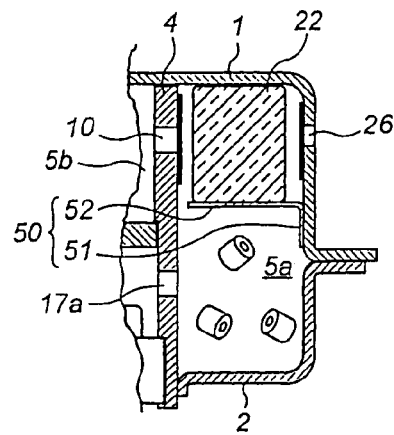
FIGS. 9(a) to (e) are vertical cross-sectional views showing yet another variation in the gas generator for the air bag.
Figure 9B:
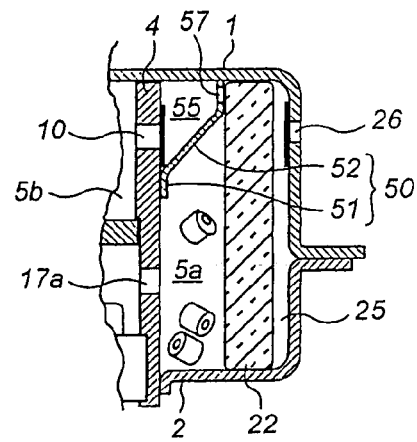
Figure 9C:
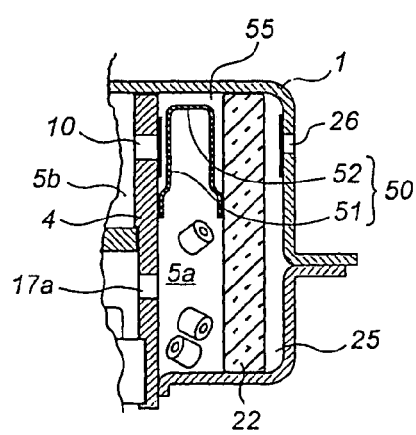
Figure 9D:
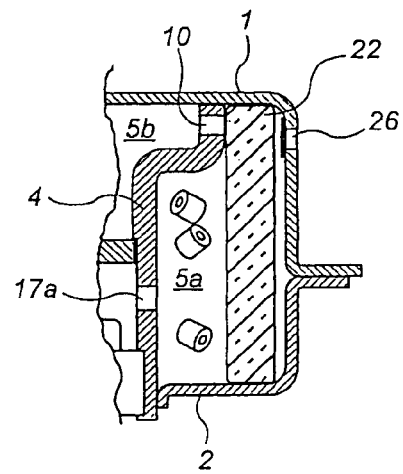
Figure 9E:
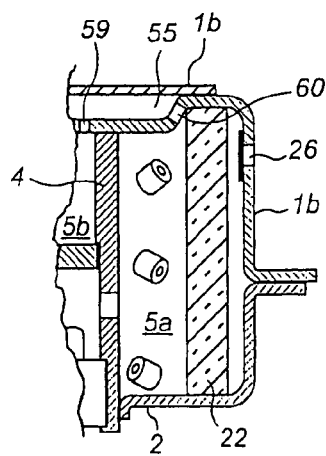
Figure 10A:
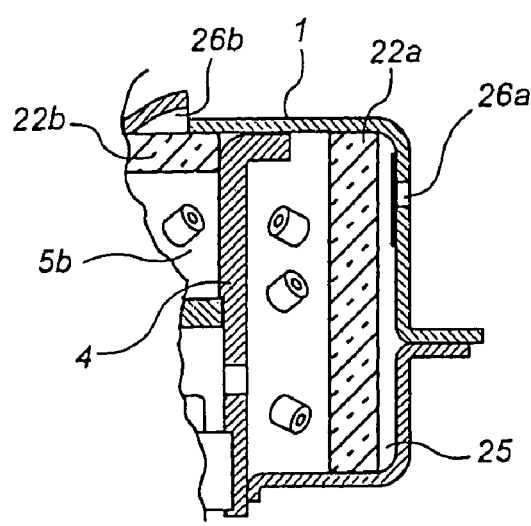
FIGS. 10(a) to (d) are vertical cross-sectional views showing yet another variation in the gas generator for the air bag.
Figure 10B:
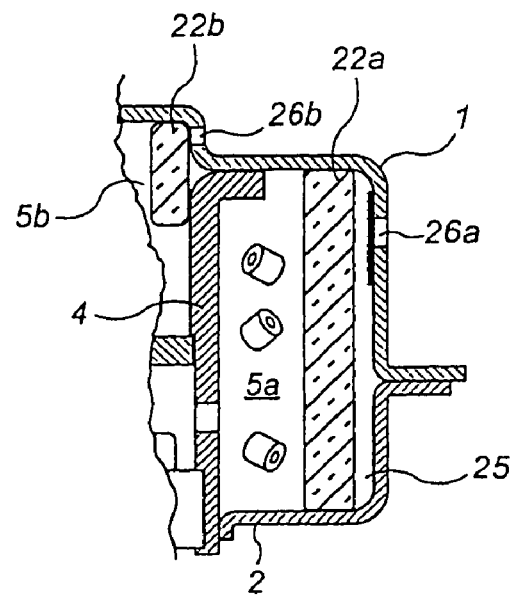
Figure 10C:
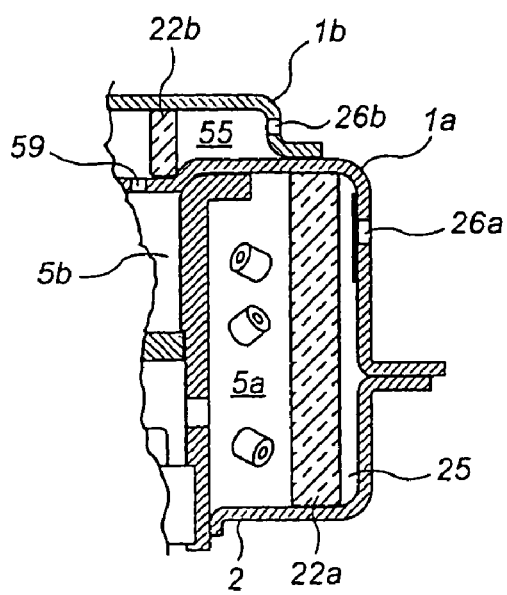
Figure 10D:
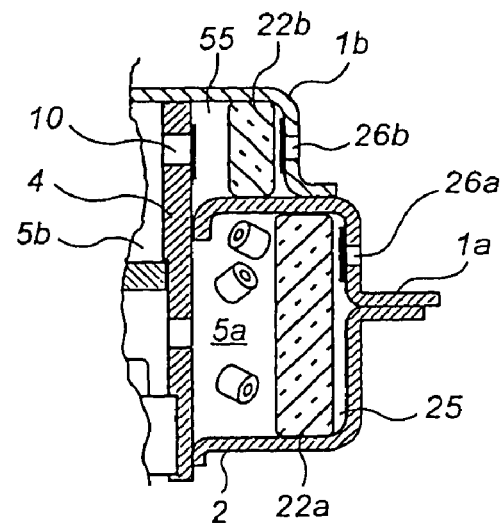

In the retainer 50 shown in each of FIGS. 7(a) and (f), a part of the cylindrical portion 51 is fitted outwardly to the inner cylindrical member 4 or fitted to an inner peripheral surface or outer peripheral surface of the coolant means 22a, or fitted into the inner peripheral surface of the housing 3 so that the part of the cylindrical portion 51 is supported and fixed in the housing.

Particularly, the retainer 50 shown in each of FIGS. 7(*a*) and (*f*) includes the inner cylindrical portion 51 and the partition wall portion. In the aspects shown in FIGS. 7(*a*), (*c*), (*d*), and (*f*), a gas ejected from the communication hole 10 collides against the cylindrical portion 51, the combustion products in the gas are collected by the cylindrical portion 51. In FIG. 7(*e*), the gas ejected from the communication hole 10 collides against the partition wall portion 52, and the combustion products in the gas are collected by the partition wall portion 52. In the aspect shown in FIG. 7(*e*), however, the gas which previously passed through the second coolant means 22*b* is ejected from the communication hole 10. Therefore, if the combustion products are further collected by the cylindrical portion 51, the gas further purified is discharged from the gas discharging port 26. In FIG. 7(*b*), the gas ejected from the communication hole 10 is previously purified by the second coolant means 22*b* and in this state, the gas collides against the cylindrical portion 51. Consequently, the combustion products can be removed more reliably.

In FIGS. 7(*a*) and (*b*), the cylindrical portion 51 of the retainer is divided into a portion which is fitted outwardly to the inner cylindrical member 4 and a portion facing the communication hole 10, and the partition wall portion 52 is provided between both portions. That is, in the retainer 50 of the present invention, the cylindrical portion 51 does not necessarily have to be arranged in a single position but can be arranged in different positions such as a portion for supporting and fixing the retainer 50 in the housing and a position for covering the communication hole 10. In FIGS. 7(*a*) and (*b*), the direction of a gas ejected from the through-hole 10 is changed by a portion of the retainer 50 which faces the communication hole 10, and the combustion products are collected.

In the retainer 50 shown in FIG. 7(*h*), the partition wall portion 52 is inclined in an outwardly directed flange-like shape from the cylindrical portion 51 fitted outwardly to the inner cylindrical member 4, and a tip of the cylindrical portion 51 and a tip of the partition wall portion 52 are connected to each other. With this arrangement, a cross section of the retainer 50 in the axial direction is of substantially right triangle, and its hypotenuse is the partition wall portion 52. In the retainer 50 shown in FIG. 7(*h*), the length of the first combustion chamber 5*a* in an axial direction of the gas generator is defined but the flow-path is not formed between the retainer 50 and the diffuser shell 1.

In FIGS. 7(*a*) to (*g*), the retainer 50 is provided with the flow-path 55 between the retainer 50 and the diffuser shell.

In FIGS. 7(*a*) to (*h*), the members and portions which are the same as those in the gas generator shown in FIG. 1 are designated with the same reference numerals, and descriptions thereof are omitted. A numeral 22 in FIG. 7 represents a filter means.

In the gas generator shown in FIG. 1, the working gases generated in the respective combustion chambers reach the coolant means through different flow-paths, and the coolant means is disposed in correspondence with each combustion chamber.

FIGS. 8(*a*) to (*e*) are cross-sectional views that show variation in essential portions of the gas generator of the present embodiment. In FIGS. 8(*a*) to (*e*), each of the members and portions which is functionally the same as those of the gas generator shown in FIG. 1 is designated with the same reference numeral as that in FIG. 1, and a description thereof is omitted.

In a gas generator shown in FIG. 8(*a*), a retainer 50 defines the upper end of the first combustion chamber 5*a* and the flow-path 55. The annular second coolant means 22*b* is disposed in the flow-path 55 side of the retainer 50. The working gas generated in the second combustion chamber is ejected from the through-hole 10 toward the flow-path 55, passes through the second coolant means 22*b*, and ejected into the gap 25 through an opening 57 formed in the retainer 50, and finally reaches the gas discharging port 26. A retainer 50 in the gas generator shown in FIG. 8(*b*) is the same as the retainer 50 shown in FIG. 8(*a*). However, the second coolant means 22*b* is disposed in the vicinity of the through-hole 10. Therefore, the working gas ejected from the through-hole 10 first passes through the second coolant means 22*b*, then passes through the flow-path 55, and ejected into the gap 25 through the opening 57 formed in the retainer 50.

In a gas generator shown in FIG. 8(*c*), by using an annular retainer 50 having a hollow partition wall portion 52, the capacity of the first combustion chamber 5*a* is increased, and at the same time, an amount of the second coolant means 22*b* and a large passing area of the working gas can be obtained. In the gas generator shown in this drawing, the working gas generated in the second combustion chamber 5*b* is ejected from the through-hole 10, and passes through the flow-path 55 and reaches the second coolant means 22*b*.

In a gas generator shown in FIG. 8(*d*), a cover shell 1*b* is provided outside the diffuser shell 1*a*, and a gap serving as the flow-path 55 is formed therebetween. The working gas generated in the second combustion chamber 5*b* is ejected from an opening 59 formed in a ceiling (upper side in the drawing) of the diffuser shell 1*a* into the gap between the diffuser shell 1*a* and the cover shell 1*b*, passes through the second coolant means 22*b* and then through the flow-space 55, and reaches the first coolant means 22*a* from an opening 60 formed just above the first coolant means 22*a*.

In a gas generator shown in FIG. 8(*e*), an upper end of the inner cylindrical member 4 is formed into an outwardly extending flange-like shape, and the through-hole 10 is provided in this portion. The retainer 50 engages the flange-like portion to form the flow-path 55. The second coolant means 22*b* is disposed between the flange-like portion and the diffuser shell 1. In the gas generator shown in this drawing, the working gas generated in the second combustion chamber passes through the second coolant means 22*b* and then is ejected from the through-hole 10 of the inner cylindrical member 4, and passes through the flow-path 55 and reaches the gas discharging port 26.

In other embodiments of the present invention, as shown in FIGS. 9(*a*) to (*e*), flow-paths for the working gases generated in the respective combustion chambers are made independently from each other, but the working gases pass through a single coolant means. That is, in these gas generators, the working gases generated in the respective combustion chambers pass through the same coolant means. The combustion chambers are spatially connected to each other only through the coolant means. In FIGS. 9(*a*) to (*e*), each of the members and portions which is functionally the same as that of the gas generator shown in FIG. 1 is designated with the same reference numeral, and a description thereof is omitted.

In the gas generator shown in FIG. 9(*a*), the coolant means 22 is disposed adjacent to and above the first combustion chamber 5*a*, a space where the coolant means 22 is disposed is practically partitioned from the first combustion chamber 5*a* by the retainer 50. In the gas generator shown in this drawing, the working gas generated in the second combustion chamber 5*b* passes through the coolant means 22 and is discharged from the gas discharging port 26. Therefore, the working gas never flows into the first combustion chamber 5a. The working gas generated in the first combustion chamber 5a flows into a space where the coolant means 22 is disposed through a gap between an inner edge of the retainer 50 and the inner cylindrical member 4, passes through the coolant means 22, and discharged from the gas discharging port 26.

In the gas generator shown in FIG. 9(*b*), the working gas generated in the second combustion chamber 5b passes through the communication hole 10 in the inner cylindrical member 4 and enters the flow-path 55, passes through the flow-path 55 and the opening 57 formed in the retainer 50, and through the coolant means 22. The working gas flowing into the coolant means 22 passes through the gap 25 and discharged from the gas discharging port 26, so that the gas never flows into the first combustion chamber 5a.

In the gas generator shown in FIG. 9(*c*), an annular retainer 50 having a hollow partition wall portion 52 is used to increase the capacity of the first combustion chamber 5a, and at the same time, to obtain a large space for providing the second coolant means 22b and the passing area for the working gas. In the gas generator shown in this drawing, the working gas generated in the second combustion chamber 5b is ejected from the through-hole 10 into the flow-path 55, passes through the flow-path 55 towards the coolant means 22, and further passes through the coolant means 22 and the gap 25, and finally discharged from the gas discharging port 26. That is, the working gas generated in the second combustion chamber 5b flows toward the gas discharging port 26, so that the gas never flows into the first combustion chamber 5a through the coolant means 22.

In the gas generator shown in FIG. 9(*d*), the diameter of the inner cylindrical member 4 at a portion near the through-hole 10 is increased to make contact with an inner periphery of the coolant means 22. Therefore, the working gas generated in the second combustion chamber 5b passes through the through-hole 10 of the inner cylindrical member 4 and is directly ejected into the coolant means 22, and flows through the coolant means 22 toward the gas discharging port 26. Thus, the working gas generated in the second combustion chamber 5b never passes through the coolant means 22 nor flows into the first combustion chamber 5a.

In the gas generator shown in FIG. 9(*e*), a cover shell 1b is provided outside the diffuser shell 1a, and a flow-path 55 is formed therebetween. The working gas generated in the second combustion chamber 5b is ejected from an opening 59 in a ceiling of the diffuser shell 1a into the flow-space 55, passes through the flow-path 55, ejected into the coolant means 22 through an opening 60 provided just above the coolant means 22 in the diffuser shell 1a and flows through the coolant means 22 toward the gas discharging port 26. Thus, the working gas generated in the second combustion chamber 5b never passes through the coolant means 22 nor flows into the first combustion chamber 5a.

Other embodiments of, the present invention provides gas generators in which flow-paths for the working gases generated in the combustion chambers are different from each other, the working gases are introduced to different coolant means and discharged from different gas discharging ports. In such gas generators, it is necessary to form different gas discharging ports 26a and 26b for the respective combustion chambers 5a and 5b, but the gas discharging ports do not necessarily have to be formed in a peripheral surface of the cylindrical housing. Such gas generators are shown in FIGS. 10(*a*) to (*d*). In FIG. 10, each of members and portions which is functionally the same as that of the gas generator shown in FIG. 1 is designated with the same numeral, and a description thereof is omitted.

In the gas generator shown in FIG. 10(*a*), a second gas discharging port 26a is formed in a ceiling side of the diffuser shell 1, and a second coolant means 22b is disposed in the diffuser shell 1 side(upper end) in the second combustion chamber 5b. The working gas generated in the first combustion chamber 5a passes through first coolant means 22a and is discharged from a first gas discharging port 26a. The working gas generated in the second combustion chamber 5b passes through the second coolant means 22b and discharged from a second gas discharging port 26b. Thus, in this gas generator, the working gases generated in the respective combustion chambers are not mixed with each other in the housing, nor the working gas generated in one of the combustion chambers does not flow into the other combustion chamber.

In the gas generator shown in FIG. 10(*b*), like in the gas generator shown in FIG. 10(*a*), the second gas discharging port 26b is provided in the ceiling side of the diffuser shell 1, and the second coolant means 22b is provided in the second combustion chamber 5b in the diffuser shell 1 side (upper end). Especially in the gas generator shown in this drawing, a center portion of the ceiling of the diffuser shell 1 projects in the axial direction, and the second gas discharging port 26b is provided in the projected peripheral surface. Therefore, in this gas generator, the working gases generated in the respective combustion chambers are not mixed with each other in the housing, nor the working gas generated in one of the combustion chambers does not flow into the other combustion chamber.

In the gas generator shown in FIG. 10(*c*), a cover shell 1b is provided outside the diffuser shell 1a, and a flow-path 55 is formed therebetween. In this gas generator shown in this drawing, the cover shell 1b constitutes the housing together with the diffuser shell 1a and the closure shell 2. Especially, this cover shell 1b is formed into an inverted cup shape and is provided at its peripheral surface with a second gas discharging port 26b. As a result, the working gas generated in the second combustion chamber 5b is ejected from an opening 59 in the ceiling side of the diffuser shell, passes through the second coolant means 22b and then through the flow-path 55, and is discharged from the second gas discharging port 26b. Therefore, the working gases generated in the respective combustion chambers are not mixed with each other in the housing, nor the working gas generated in one of the combustion chambers does not flow into the other combustion chamber.

In the gas generator shown in FIG. 10(*d*), an inner cylindrical member 4 penetrates a ceiling of the diffuser shell 1a, and an open end of the inner cylindrical member 4 is closed by a cover shell 1b integrally formed together with the diffuser shell 1a. Thus, in the gas generator shown in this drawing, the cover shell 1b constitutes the housing together with the diffuser shell 1a and the closure shell 2. In this gas generator, the height of the first combustion chamber 5a is defined by an inner surface of the ceiling of the diffuser shell 1a, and the flow-path 55 is formed between the diffuser shell 1a and the cover shell 1b. The second coolant means is provided inside the cover shell 1b. In this gas generator, the working gas generated in the second combustion chamber 5b flows into the flow-path 55 from the through-hole formed in the inner cylindrical member 4, passes through the second coolant means 22b, and discharged from the housing through the second gas discharging port 26b. Thus, in the gas generator shown in this drawing, the working gases generated in the respective combustion chambers are not mixed with each other in the housing, nor the working gas generated in one of the combustion chambers does not flow into the other combustion chamber.

Figure 11:
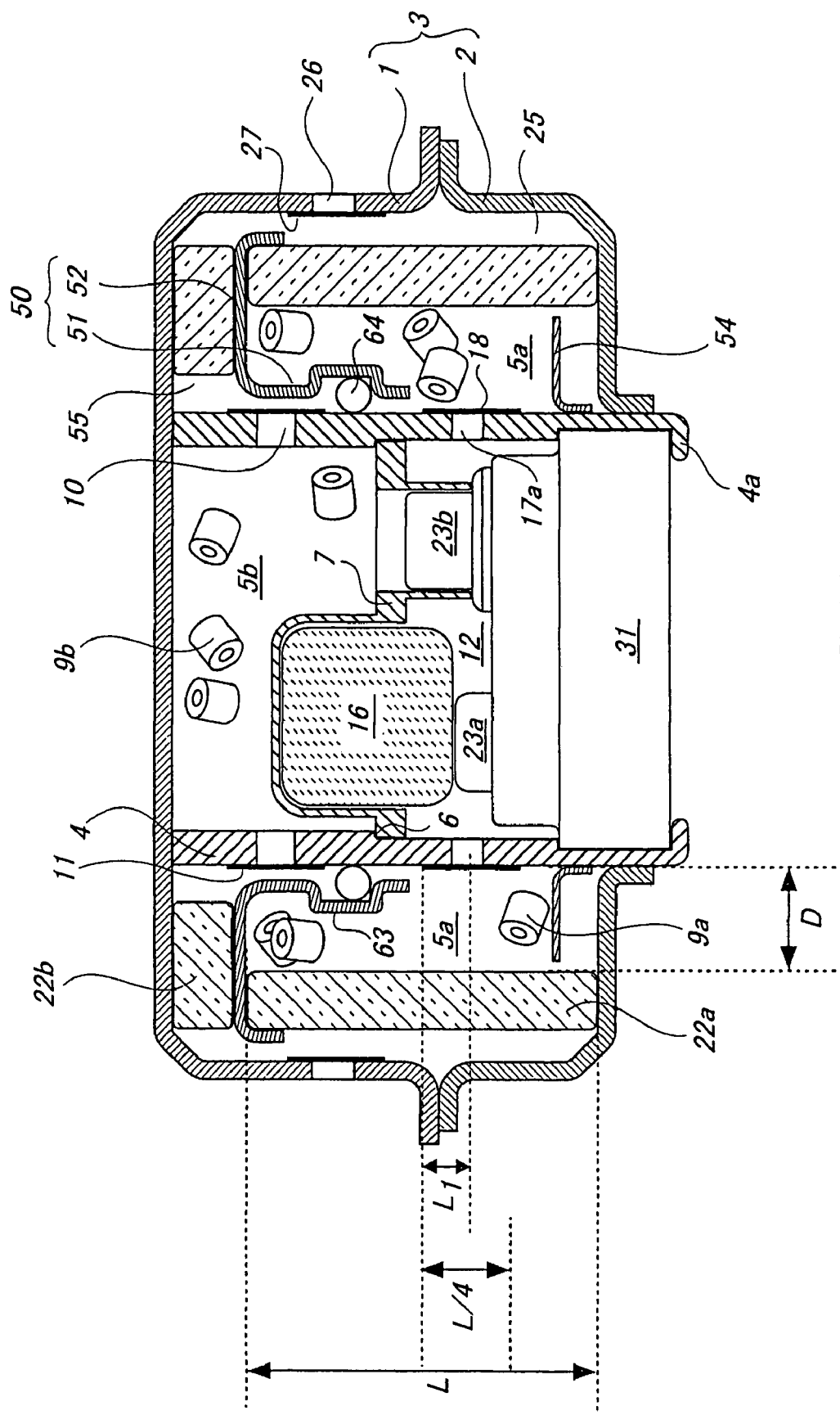
FIG. 11 is vertical cross-sectional view showing another embodiment of the gas generator.

FIG. 11 shows another embodiment of the present invention, in which a cylindrical portion (or inner cylindrical portion) 51 of a retainer 50 is provided with a swelling portion 63 having a part thereof swelled outwardly in the radial direction, and an O-ring 64 is disposed between the swelling portion 63 and the inner cylindrical member. With this structure, the O-ring 64 seals any gap between the inner cylindrical member 4 and the retainer 50 (especially in the swelling portion 63), and even if the first gas generating agent 9a is burnt, a working gas does not flow into a flow-path 55. When the first gas generating agent 9a and the second gas generating agent 9b are burnt simultaneously, a pressure inside the first combustion chamber 5a is sufficiently increased by a combustion of the first gas generating agent 9a and thus, the working gas generated in the second combustion chamber 9b does not flow into the first combustion chamber 5a. Therefore, when the engagement structure between the inner cylindrical member and the retainer is formed as shown in FIG. 11, it is unnecessary to adjust the size of the cylindrical portion (or the inner cylindrical portion) 51 of the retainer 50 to tightly engage the outer peripheral surface of the inner cylindrical member 50.

Especially when the engagement structure between the inner cylindrical member and the retainer is formed as shown in FIG. 11, the retainer 50 is supported by the second coolant means 22b, and thereby, the retainer 50 is prevented from moving in the axial direction of the housing. Further, cutting processes of the outer peripheral surface of the inner cylindrical member (i.e., the outer peripheral surface of the cylindrical peripheral wall) can be eliminated, so that it is advantageous to manufacturing and costs.

In FIG. 11, each of the members and portions which is functionally the same as that of the gas generator shown in FIG. 1 is designated with the same numeral, and a description thereof is omitted.

However, in the embodiment shown in FIG. 11, it is no longer necessary to provide the retainer 50 with the engaging portion, or to adjust the diameter of the cylindrical portion 51 of the retainer 50 such that it snuggly fits around the peripheral wall of the inner cylindrical member 4.

In the embodiment shown in FIG. 1, the engaging portion 56 provided on an end of the cylindrical portion (or the inner cylindrical portion) 51 is engaged with the step-notch 53 of the inner cylindrical member, thereby fixing the retainer 50 in the housing. In the gas generators shown in FIGS. 8(a) to (c), part of the cylindrical portion 51 is formed into such a size to be fitted outwardly to the cylindrical peripheral wall of the inner cylindrical member 4, and the retainer 50 is press-fitted outside the inner cylindrical member to fix the retainer 50 in the housing.

The invention claimed is:

1. A gas generator for an air bag, comprising:
   a cylindrical housing having a gas discharging port;
   an inner cylindrical member disposed inside the cylindrical housing;
   ignition means disposed inside the inner cylindrical member; and
   a first combustion chamber provided outside the inner cylindrical member to accommodate a first gas generating agent;
   a retainer provided inside the housing and extending from the inner cylindrical member in a radial direction of the gas generator without making contact with the housing, the retainer being provided with a partition wall surface that defines an average length of the first combustion chamber in an axial direction of the gas generator; and
   a partition wall that divides an inside of the inner cylindrical member into an ignition means accommodating chamber and a second combustion chamber that accommodates a second gas generating agent,
   wherein, a ratio (D/L) of an average distance (D) in a radial direction of the first combustion chamber to the average length (L) is in a range of 0.2 to 2.0, and
   wherein a gas generated by the second gas generating agent is discharged from the gas discharge port without passing through the first combustion chamber.

2. A gas generator for an air bag according to claim 1, wherein the retainer defines the first combustion chamber at a first side thereof and a flow-path at a second side thereof opposite to the first side for passing the gas generated by the second combustion chamber, and the inner cylindrical member is provided with a communication hole that makes the second combustion chamber and the flow-path communicate with each other.

3. A retainer for a gas generator for an air bag, the gas generator including a cylindrical housing having a gas discharging port, an inner cylindrical member provided inside the cylindrical housing and having a cylindrical peripheral wall provided with a through-hole, and at least one of ignition means and a gas generating agent being disposed inside the inner cylindrical member, the retainer comprising:
   a cylindrical portion adapted to be positioned with a distance from an outer peripheral surface of the cylindrical peripheral wall and to face the outer peripheral surface,
   a flange-shaped partition wall portion integrally formed with the cylindrical portion, and
   at least one of the cylindrical portion and the partition wall portion being adapted to change a flow of a gas ejected from the through-hole formed in the cylindrical peripheral wall and adapted to collect combustion products other than gaseous material included in the gas,
   wherein the retainer is adapted to be provided inside the housing and extending from the inner cylindrical member in a radial direction of the gas generator without making contact with the housing.

4. A retainer according to claim 3, wherein the cylindrical portion has a size and shape adapted to cover at least a communication hole of the inner cylindrical member.

5. A retainer according to claim 3 or 4, wherein the cylindrical portion has a size and shape adapted to fit a part of the cylindrical peripheral wall of the inner cylindrical member from an outside.

6. A retainer according to claim 3, wherein the gas generator further includes, annular coolant means for purifying or cooling a gas generated by combustion of the gas generating agent stored in the cylindrical housing, wherein
   at least a part of the cylindrical portion has a shape and size adapted to fit at least one of an inner peripheral surface and an outer peripheral surface of the coolant means and an outer peripheral surface of a peripheral wall of the cylindrical wall.

7. A retainer according to claim 3, wherein an end opening of the cylindrical portion is integrally formed with an engaging portion adapted to engage a cylindrical peripheral wall of an inner cylindrical member having an inwardly directed flange-like shape.

8. A gas generator for an air bag, comprising:
a cylindrical housing having a gas discharging port;
an inner cylindrical member having a cylindrical peripheral wall provided with a through-hole;
at least one of ignition means and a first gas generating agent disposed in the inner cylindrical member; and
a retainer provided inside the housing and extending from the inner cylindrical member in a radial direction of the gas generator without making contact with the housing, the retainer having a cylindrical portion surrounding a part of the inner cylindrical member and a flange-shaped partition wall portion integrally formed on the cylindrical portion, disposed outside the inner cylindrical member, wherein
the cylindrical portion of the retainer is positioned with a distance from an outer peripheral surface of the cylindrical peripheral wall and faces the outer peripheral surface, and at least one of the cylindrical portion and the peripheral wall changes flow of a gas ejected from a through-hole formed in the cylindrical peripheral wall of the inner cylindrical member and collects combustion products other than gaseous material included in the gas.

9. A gas generator for an air bag according to claim 8, wherein the cylindrical portion of the retainer opposes a through-hole provided in a cylindrical peripheral wall of the inner cylindrical member.

10. A gas generator for an air bag according to claim 8 or 9, wherein the cylindrical portion of the retainer faces the through-hole of the inner cylindrical member without closing the through-hole.

11. A gas generator for an air bag according to claim 8, wherein a part of the retainer is fitted to the cylindrical peripheral wall of the inner cylindrical member from an outside.

12. A gas generator for an air bag according to claim 8, further comprising:
annular coolant means for one of purifying and cooling a gas generated by combustion of the gas generating agent stored in the housing being accommodated in the housing,
wherein at least a part of the retainer is fitted to at least one of an inner peripheral surface and an outer peripheral surface of the coolant means.

13. A gas generator for an air bag according to claim 8, wherein an end opening of the cylindrical portion is integrally formed with an engaging portion which engages a cylindrical peripheral wall of an inner cylindrical member in an inwardly directed flange-like shape.

14. A gas generator for an air bag according to claim 13, wherein the housing includes a diffuser shell having a gas discharging port and a closure shell forming an inner space together with the diffuser shell, the inner cylindrical member includes a step-notch formed by notching an outer peripheral surface of the inner cylindrical member in the diffuser shell side, and an engaging portion of the retainer engages the step-notch.

15. A gas generator for an air bag according to claim 8, further comprising:
a combustion chamber for accommodating a second gas generating agent provided outside the inner cylindrical member,
wherein a peripheral wall of the retainer has a shape and size that defines at least an axial end of the combustion chamber and is provided on the axial end of the combustion chamber.

16. A gas generator for an air bag according to claim 15, wherein, in the retainer, the partition wall portion receives combustion pressure of the second gas generating agent accommodated in the combustion chamber, and thereby an engaging portion is pushed against a step-notched portion of the inner cylindrical member.

17. A gas generator for an air bag according to claim 8, wherein, inside the inner cylindrical member, an ignition means accommodating chamber and a combustion chamber are defined adjacent to each other in an axial direction by a partition wall, and a communication hole of the inner cylindrical member is open at the combustion chamber.

18. A gas generator for an air bag according to claim 8, wherein the inside of the inner cylindrical member is divided into an ignition means accommodating chamber and a combustion chamber by a partition wall, and the retainer collects the combustion products other than the gaseous material generated by combustion of the first gas generating agent.

19. A gas generator for an air bag according to claim 8, wherein the inner cylindrical member defines a first combustion chamber inside thereof that accommodates the first gas generating agent, and a second combustion chamber outside thereof that accommodates a second gas generating agent, the second gas generating agent includes fuel and oxidizing agent, the oxidizing agent is basic metal nitrate.

20. A gas generator for an air bag according to claim 19, wherein the fuel is guanidine derivatives or a mixture thereof.

21. A gas generator for an air bag, comprising:
a housing having a gas discharging port;
an inner cylindrical member provided inside the housing and having a cylindrical peripheral wall;
a first combustion chamber and a second combustion chamber separated by the inner cylindrical member;
gas generating agents charged in the first combustion chamber and the second combustion chamber;
a retainer defining the first combustion chamber and a flow-path for directing a gas generated in the second combustion chamber towards the gas discharging port;
a first coolant provided inside the first combustion chamber; and
a second coolant provided inside the flow-path.

22. A gas generator for an air bag, comprising:
a housing having a gas discharging port;
an inner cylindrical member provided inside the housing and having a cylindrical peripheral wall;
two combustion chambers defined by the inner cylindrical member; and
gas generating agents adapted to be burnt for generating a working gas being charged in the respective combustion chambers,
wherein, working gases generated in the respective combustion chambers pass through different flow-paths and reach the gas discharging port, and
wherein, the working gases generated in the respective combustion chambers pass through different coolant means to reach the gas discharging port.

23. A gas generator for an air bag, comprising:
a housing having a gas discharging port;
an inner cylindrical member provided inside the housing and having a cylindrical peripheral wall;
a first combustion chamber and a second combustion chamber separated by the inner cylindrical member;
gas generating agents adapted to be charged in the first combustion chamber and the second combustion chamber; and a retainer defining a first flow-path for a gas generated in the first combustion chamber and a second flow-path for a gas generated in the second combustion chamber, the second flow-path being substantially independent from the first flow-path, wherein the inside of the inner cylindrical member is divided into an ignition means accommodating chamber and the second combustion chamber by a partition wall, and the retainer collects combustion products other than gaseous material generated by combustion of the second gas generating agent.

24. A gas generator for an air bag, comprising:
a housing having a gas discharging port;
an inner cylindrical member provided inside the housing and having a cylindrical peripheral wall;
a first combustion chamber and a second combustion chamber separated by the inner cylindrical member;
gas generating agents charged in the first combustion chamber and the second combustion chamber;
a retainer defining the first combustion chamber and a flow-path for directing a gas generated in the second combustion chamber towards the gas discharging port;
wherein the inside of the inner cylindrical member is divided into an ignition means accommodating chamber and a second combustion chamber by a partition wall, and the retainer collects combustion products other than gaseous material generated by combustion of the second gas generating agent.

25. A gas generator for an air bag, comprising:
a cylindrical housing having a gas discharging port;
an inner cylindrical member having a cylindrical peripheral wall provided with a through-hole;
at least one of an ignition means and a first gas generating agent disposed in the inner cylindrical member;
a retainer having a cylindrical portion surrounding a part of the inner cylindrical member and a flange-shaped partition wall portion integrally formed on the cylindrical portion, disposed outside the inner cylindrical member; and
a first combustion chamber for accommodating a second gas generating agent radially provided outside the inner cylindrical member,
wherein the cylindrical portion of the retainer is positioned with a distance from an outer peripheral surface of the cylindrical peripheral wall and faces the outer peripheral surface, and at least one of the cylindrical portion and the peripheral wall changes flow of a gas ejected from a through-hole formed in the cylindrical peripheral wall of the inner cylindrical member and collects combustion products other than gaseous material included in the gas, and
wherein a peripheral wall of the retainer has a shape and size that defines at least an axial end of the first combustion chamber and is provided on the axial end of the first combustion chamber.

26. A gas generator for an air bag, comprising:
a cylindrical housing having a gas discharging port;
an inner cylindrical member having a cylindrical peripheral wall provided with a through-hole;
at least one of an ignition means and a gas generating agent disposed in the inner cylindrical member; and
a retainer having a cylindrical portion surrounding a part of the inner cylindrical member and a flange-shaped partition wall portion integrally formed on the cylindrical portion, disposed outside the inner cylindrical member, wherein
the cylindrical portion of the retainer is positioned with a distance from an outer peripheral surface of the cylindrical peripheral wall and faces the outer peripheral surface, and at least one of the cylindrical portion and the peripheral wall changes flow of a gas ejected from a through-hole formed in the cylindrical peripheral wall of the inner cylindrical member and collects combustion products other than gaseous material included in the gas, and
wherein, inside of the inner cylindrical member, an ignition means accommodating chamber and a combustion chamber are defined adjacent to each other in an axial direction of the gas generator by a partition wall, and a communication hole of the inner cylindrical member is open at the combustion chamber.

27. A gas generator for an air bag, comprising:
a cylindrical housing having a gas discharging port;
an inner cylindrical member having a cylindrical peripheral wall provided with a through-hole;
at least one of an ignition means and a gas generating agent disposed in the inner cylindrical member; and
a retainer having a cylindrical portion surrounding a part of the inner cylindrical member and a flange-shaped partition wall portion integrally formed on the cylindrical portion, disposed outside the inner cylindrical member, wherein
the cylindrical portion of the retainer is positioned with a distance from an outer peripheral surface of the cylindrical peripheral wall and faces the outer peripheral surface, and at least one of the cylindrical portion and the peripheral wall changes flow of a gas ejected from a through-hole formed in the cylindrical peripheral wall of the inner cylindrical member and collects combustion products other than gaseous material included in the gas, and
wherein the inside of the inner cylindrical member is divided into an ignition means accommodating chamber and a combustion chamber by a partition wall, and the retainer collects the combustion products other than the gaseous material generated by combustion of the gas generating agent.

* * * * *